United States Patent
Shin

(10) Patent No.: US 10,921,232 B2
(45) Date of Patent: Feb. 16, 2021

(54) METHOD FOR CALCULATING PERMEABILITY OF POROUS MEDIUM BY USING ANALYSIS OF FRICTION FLOW CHARACTERISTIC VARIABLE IN POROUS MEDIUM

(71) Applicant: KOREA GAS CORPORATION, Daegu (KR)

(72) Inventor: Chang Hoon Shin, Gyeonggi-do (KR)

(73) Assignee: KOREA GAS CORPORATION, Daegu (KR)

(*) Notice: Subject to any disclaimer, the term of this patent is extended or adjusted under 35 U.S.C. 154(b) by 54 days.

(21) Appl. No.: 16/344,942

(22) PCT Filed: Oct. 25, 2017

(86) PCT No.: PCT/KR2017/011840
§ 371 (c)(1),
(2) Date: Apr. 25, 2019

(87) PCT Pub. No.: WO2018/080163
PCT Pub. Date: May 3, 2018

(65) Prior Publication Data
US 2019/0265149 A1    Aug. 29, 2019

(30) Foreign Application Priority Data
Oct. 26, 2016 (KR) .................. 10-2016-0140266

(51) Int. Cl.
*G01N 15/08* (2006.01)
*G06F 17/15* (2006.01)

(52) U.S. Cl.
CPC ......... *G01N 15/08* (2013.01); *G01N 15/0826* (2013.01); *G06F 17/15* (2013.01)

(58) Field of Classification Search
CPC ..... G01N 15/08; G01N 15/0826; G01F 17/15
See application file for complete search history.

(56) References Cited

U.S. PATENT DOCUMENTS 5,503,001 A * 4/1996 Wong ................... G01N 33/241
                                                  324/351
7,657,415 B2 * 2/2010 Panga ..................... E21B 43/25
                                                  703/12
(Continued)

FOREIGN PATENT DOCUMENTS

WO      2014/178504 A1    11/2014

OTHER PUBLICATIONS

Zhang, "Permeability of shale by the beam-bending method" International Journal of Rock Mechanics & Mining Sciences 53 (2012) 179-191.

(Continued)

*Primary Examiner* — John Fitzgerald
(74) *Attorney, Agent, or Firm* — Stuart H. Mayer; Mayer & Williams PC

(57) ABSTRACT

Provided is a method of calculating permeability of a porous medium by using analysis of feature variables of friction flows through the porous medium for laminar and turbulent flows considering a geometric feature and a friction loss feature. A method of calculating permeability of a porous medium, according to an embodiment of the present invention, includes obtaining hydraulic diameters and friction factor-Reynolds number relationships of a plurality of reference porous media, deriving a hydraulic diameter-friction factor-Reynolds number correlation between the hydraulic diameters and the friction factor-Reynolds number relationships, and obtaining permeability of a porous medium to be predicted, by using the hydraulic diameter-friction factor-Reynolds number correlation.

19 Claims, 8 Drawing Sheets

(56) References Cited

U.S. PATENT DOCUMENTS

| | | | |
|---|---|---|---|
| 8,146,350 B2* | 4/2012 | Bhatia | F01N 3/023 60/295 |
| 8,161,738 B2* | 4/2012 | He | F01N 3/103 60/296 |
| 10,324,017 B2* | 6/2019 | Gulli | G01N 27/3335 |
| 2002/0189325 A1* | 12/2002 | Bowen | G01N 33/24 73/38 |
| 2009/0113883 A1* | 5/2009 | Bhatia | F01N 3/023 60/320 |
| 2010/0126144 A1* | 5/2010 | He | F01N 3/106 60/286 |
| 2017/0074773 A1* | 3/2017 | Gulli | G01N 15/0826 |
| 2020/0025668 A1* | 1/2020 | Shin | G01N 15/088 |
| 2020/0116059 A1* | 4/2020 | Ishihara | B01D 46/00 |

OTHER PUBLICATIONS

Richeng Liu, "Estimating permeability of porous media based on modified Hagen-Poiseuille flow in tortuous capillaries with variable lengths" Microfluid Nanofluid (2016) 20:120.

Joo-Suk Noh, et al. "Heat Transfer and Flow Characteristics in an Annulus Filled with aluminum Foam" Journal of Energy Engineering, vol. 15, No. 1, pp. 60-66 (2006) (english abstract).

Shin, et al., "A DNS Simulation Study for Examining the Tortuosity Effects on the Definitions of Hydraulic Diameter and Friction Factor of a Porous Medium" Korean Society of Computational Fluids Engineering, Jul. 2016, pp. 37-38. (Translation enclosed).

* cited by examiner (A) Thickest (B) Thickest (C) Base (D) Thinner (E) Thinnest

METHOD FOR CALCULATING PERMEABILITY OF POROUS MEDIUM BY USING ANALYSIS OF FRICTION FLOW CHARACTERISTIC VARIABLE IN POROUS MEDIUM

TECHNICAL FIELD

The present invention relates to flow through a porous medium, and more particularly, a method of calculating permeability of a porous medium by using analysis of feature variables of friction flows through the porous medium.

The present invention is proposed with reference to Research Project No. 20132510100060 supported by the Korea Institute of Energy Technology Evaluation and Planning (KETEP), granted financial resource from the Ministry of Trade, Industry & Energy, Republic of Korea.

BACKGROUND ART

Research has been conducted on calculation of permeability in a broad range in various fields, e.g., nuclear energy, biomechanics, construction engineering, and oil engineering. However, permeability calculation methods properly considering changes in geometric shapes of various types of rocks, fractures, biological cells, and other porous structures and practically applicable to both of laminar flow and turbulent flow have not been developed yet (Sahimi, 2011). In particular, permeability variations based on hydraulic fractures in shale reservoirs correspond to a very significant consideration for reservoir fluid production analysis. Due to large geometric dimensions and pressure changes, fractures are subjected to relatively high flow velocities and cause turbulent flow at an early stage of production. Furthermore, formation stress changes occur due to fluid production for several months or several years, and thus such geometric changes have a negative effect on permeability. Therefore, permeability variation features based on geometric changes (generally, reductions) and flow condition changes (generally, from turbulent flow to laminar flow) need to be clarified for production forecast (Cipolla, 2010).

Therefore, a new permeability calculation method considering Non-Darcy effects and geometric changes is required. In most cases, flow features and correlations of porous flow are expressed based on the Darcy equation, which assumes a simple proportional relationship between a flow velocity and a pressure drop and ignores specific descriptions and accurate definitions of main feature variables including permeability. A large number of experimental, numerical, and theoretical studies which explain deviation from the Darcy's law for a high Reynolds number or propose various solution methods thereof have been disclosed (Ingham, D. B. and Pop, I., 2004) but are applicable only to laminar flow regions. Thus, permeability values are generally measured using a large number of direct tests for media having different porosity values under a broad range of flow conditions, and even for media of the same type. Actually, much cost and time are required for a large number of tests on various types of real rocks, formations, flow conditions, and target regions. Therefore, a new permeability calculation method capable of properly considering flow region changes or various geometric changes and of remarkably reducing a required number of tests needs to be developed.

DETAILED DESCRIPTION OF THE INVENTION

Technical Problem

The present invention provides a method of calculating permeability of a porous medium by using analysis of feature variables of friction flows through the porous medium for laminar and turbulent flows considering a geometric feature and a friction loss feature.

However, the scope of the present invention is not limited thereto.

Technical Solution

According to an aspect of the present invention, there is provided a method of calculating permeability of a porous medium, the method including obtaining hydraulic diameters and friction factor-Reynolds number relationships of a plurality of reference porous media, deriving a hydraulic diameter-friction factor-Reynolds number correlation between the hydraulic diameters and the friction factor-Reynolds number relationships, and obtaining permeability of a porous medium to be predicted, by using the hydraulic diameter-friction factor-Reynolds number correlation.

The obtaining of the permeability of the porous medium to be predicted may include obtaining a flow-velocity-based permeability of the porous medium to be predicted, by using the hydraulic diameter-friction factor-Reynolds number correlation, obtaining a hydraulic-diameter-based permeability by correcting the flow-velocity-based permeability by using a hydraulic diameter, and obtaining a final hydraulic-diameter-based permeability as the permeability of the porous medium to be predicted, by correcting the hydraulic-diameter-based permeability by using laminar tortuosity.

The flow-velocity-based permeability may be calculated and obtained using an equation shown below.

$$k_{FEP} = \frac{2D_h^2}{f_u Re_u}$$

(where $k_{FEP}$ is permeability, $D_h$ is a hydraulic diameter, T is tortuosity, $f_u$ is a friction factor based on a flow velocity u, and $Re_u$ is a Reynolds number based on the flow velocity u.)

The obtaining of the hydraulic-diameter-based permeability may be performed using an equation shown below.

$$fRe_{D_h} = f_v Re_v \times D_h{}^n = f_u Re_u \times D_h{}^u \times \varphi T$$

where $f_v Re_v = f_u Re_u \times \varphi T$ (where $f.Re_\varphi$ is a friction factor-Reynolds number relationship based on porosity, $f_v$ is a friction factor based on a flow velocity v, $Re_v$ is a Reynolds number based on the flow velocity v, $f_u$ is a friction factor based on a flow velocity u, $Re_u$ is a Reynolds number based on the flow velocity u, $D_h$ is a hydraulic diameter, $\varphi$ is porosity of a porous medium, and T is tortuosity.)

The hydraulic-diameter-based permeability may be calculated and obtained using an equation shown below.

$$k_{FEP} = \frac{2D_h^{n+2} \cdot \varphi T}{f \ Re_{D_h}}$$

(where $k_{FEP}$ is permeability, $D_h$ is a hydraulic diameter, $\varphi$ is porosity of a porous medium, T is tortuosity, and $f.Re_{D_h}$ is a friction factor-Reynolds number relationship based on a hydraulic diameter.)

The friction factor-Reynolds number relationship $f.Re_{D_h}$ based on the hydraulic diameter may have a constant value for the same medium in a laminar flow region.

The obtaining of the final hydraulic-diameter-based permeability may be performed using an equation shown below.

$$k_{FEP} = \frac{2D_h^{n+2} \cdot \varphi T}{f\,Re_{D_h}^*}$$

(where $k_{FEP}$ is permeability, $D_h$ is a hydraulic diameter, $\varphi$ is porosity of a porous medium, T is tortuosity, and $f.Re^*_{Dh}$ is a friction factor-Reynolds number relationship based on a hydraulic diameter using laminar tortuosity.)

The obtaining of the final hydraulic-diameter-based permeability may be performed using an equation shown below.

$$k_{FEP} = \frac{2D_h^3 \cdot \varphi T}{f\,Re_{D_h}^*}$$

(where $k_{FEP}$ is permeability, $D_h$ is a hydraulic diameter, $\varphi$ is porosity of a porous medium, T is tortuosity, and $f.Re^*_{Dh}$ is a friction factor-Reynolds number relationship based on a hydraulic diameter using laminar tortuosity.)

The obtaining of the final hydraulic-diameter-based permeability may be performed using an equation shown below.

$$k_{FEP} = \frac{2D_h^3 \cdot \varphi^m}{f\,Re_{D_h}^*}$$

(where $k_{FEP}$ is permeability, $D_h$ is a hydraulic diameter, $\varphi$ is porosity of a porous medium, m is a cementation factor, and $f.Re^*_{Dh}$ is a friction factor-Reynolds number relationship based on a hydraulic diameter using laminar tortuosity.)

The obtaining of the final hydraulic-diameter-based permeability may be performed using an equation shown below.

$$k_{FEP} = \frac{128\,\varphi^{m+3}}{f\,Re_{S_S}^*}$$

(where $k_{FEP}$ is permeability, $\varphi$ is porosity of a porous medium, m is a cementation factor, and $f.Re^*_{Ss}$ is a friction factor-Reynolds number relationship based on a hydraulic diameter using laminar tortuosity and a specific surface area.)

The obtaining of the final hydraulic-diameter-based permeability may be performed using an equation shown below.

$$k_{FEP} \approx \frac{128\,\varphi^{m+3}}{f\,Re_{S_{SC}}^*} = f(\varphi)$$

(where $k_{FEP}$ is permeability, $\varphi$ is porosity of a porous medium, m is a cementation factor, and $f.Re^*_{Ssc}$ is a friction factor-Reynolds number relationship based on a hydraulic diameter using laminar tortuosity and a specific surface area having a constant value.)

The obtaining of the permeability of the porous medium to be predicted may include obtaining a flow-velocity-based permeability of the porous medium to be predicted, by using the hydraulic diameter-friction factor-Reynolds number correlation, obtaining a porosity-based permeability by correcting the flow-velocity-based permeability by using porosity, and obtaining a final porosity-based permeability as the permeability of the porous medium to be predicted, by correcting the porosity-based permeability by using laminar tortuosity.

The flow-velocity-based permeability may be calculated and obtained using an equation shown below.

$$k_{FEP} = \frac{2D_h^2 \cdot \varphi\,T}{f_v\,Re_v}$$

(where $k_{FEP}$ is permeability, $D_h$ is a hydraulic diameter, $\varphi$ is porosity of a porous medium, T is tortuosity, $f_v$ is a friction factor based on a flow velocity v, and $Re_v$ is a Reynolds number based on the flow velocity v.)

The obtaining of the porosity-based permeability may be performed using an equation shown below.

$$f Re_\varphi \equiv f_v Re_v \times \varphi^n = f_u Re_u \times \varphi^n \times \varphi T$$

where $f_v\,Re_v = f_u\,Re_u \times \varphi T$ (where $f.Re_\varphi$ is a friction factor-Reynolds number relationship based on porosity, $f_v$ is a friction factor based on a flow velocity v, $Re_v$ is a Reynolds number based on the flow velocity v, $f_u$ is a friction factor based on a flow velocity u, $Re_u$ is a Reynolds number based on the flow velocity u, $\varphi$ is porosity of a porous medium, and T is tortuosity.)

The porosity-based permeability may be calculated and obtained using an equation shown below.

$$k_{FEP} \cong \frac{2D_h^2 \cdot \varphi^{n+1}\,T}{f\,Re_\varphi}$$

(where $k_{FEP}$ is permeability, $D_h$ is a hydraulic diameter, $\varphi$ is porosity of a porous medium, T is tortuosity, and $f.Re_\varphi$ is a friction factor-Reynolds number relationship based on porosity.)

The friction factor-Reynolds number relationship $f.Re_\varphi$ based on the porosity may have a constant value for the same medium in a laminar flow region.

The obtaining of the final porosity-based permeability may be performed using an equation shown below.

$$k_{FEP} \cong \frac{2D_h^2 \cdot \varphi^{n+1}\,T}{f\,Re_\varphi^*}$$

(where $k_{FEP}$ is permeability, $D_h$ is a hydraulic diameter, $\varphi$ is porosity of a porous medium, T is tortuosity, and $f.Re^*_\varphi$ is a friction factor-Reynolds number relationship based on porosity using laminar tortuosity.)

The obtaining of the final porosity-based permeability may be performed using an equation shown below.

$$k_{FEP} \cong \frac{2D_h^2 \cdot \phi^2}{f\, Re_\phi^*} T$$

(where $k_{FEP}$ is permeability, $D_h$ is a hydraulic diameter, $\phi$ is porosity of a porous medium, T is tortuosity, and $f.Re_\phi^*$ is a friction factor-Reynolds number relationship based on porosity using laminar tortuosity.)

The obtaining of the final porosity-based permeability may be performed using an equation shown below.

$$k_{FEP} \cong \frac{2D_h^2 \cdot \phi^{m+1}}{f\, Re_\phi^*}$$

(where $k_{FEP}$ is permeability, $D_h$ is a hydraulic diameter, $\phi$ is porosity of a porous medium, m is a cementation factor, and $f.Re_\phi^*$ is a friction factor-Reynolds number relationship based on porosity using laminar tortuosity.)

Advantageous Effects

Research has been conducted on calculation of permeability in a broad range in various fields. However, methods properly considering various geometric and rheological feature changes, e.g., hydraulic fracture closure for several years, have not been developed yet. Thus, the present invention proposes a new permeability calculation method based on a generalized Darcy friction flow relationship and, in particular, checks changing friction flow feature variables and features. In the present invention, computational fluid dynamics (CFD) simulation was performed on simple hydraulic fractures filled with five layers of structurized spherical microbeads and associated with geometric changes and flow transitions. Basically, in the present invention, it is checked whether main structures and geometric shapes of flow paths are preserved even when geometric variations occurs in a porous medium. However, it is found that the number and discontinuity of streamlines are rapidly increased in transitional and turbulent flow regions. Furthermore, in the present study, friction flow features were quantitative and interpretatively analyzed. Consequently, in the present study, modified friction flow feature variables are successfully disclosed as similarity feature variables of porous flows.

Conclusionly, both a generalized Darcy friction flow relationship and a friction equivalent permeability (FEP) equation are modified using the disclosed similarity feature variables. For verification thereof, FEP values of other aperture models were estimated and agreements thereof with original permeability values were checked. Finally, it is expected the method proposed and verified in the present study may effectively measure permeability variations in a porous medium due to changes in geometric variables and flow regions, which include hydraulic fracture closure.

However, the above-described effects of the present invention are merely examples and the scope of the present invention is not limited thereto.

BEST MODE

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art.

A method of calculating permeability of a porous medium, according to the present invention, may be implemented as described below.

Figure 1:
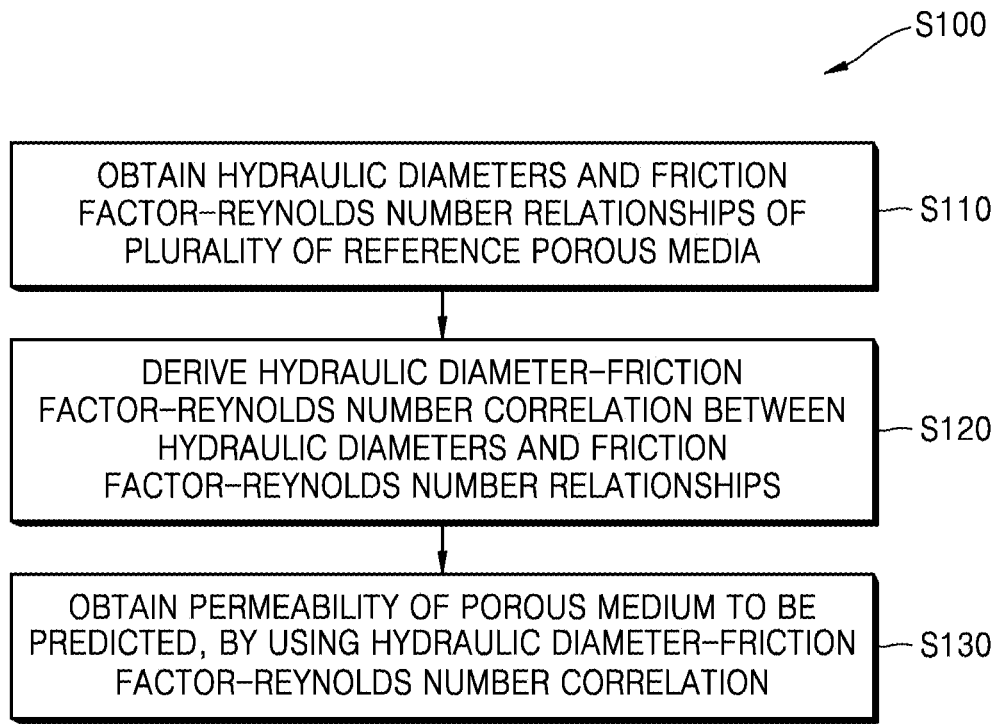
FIG. 1 is a flowchart of a method of calculating permeability of a porous medium, according to an embodiment of the present invention.

FIG. 1 is a flowchart of a method S100 of calculating permeability of a porous medium, according to an embodiment of the present invention.

Referring to FIG. 1, the method S100 includes obtaining hydraulic diameters and friction factor-Reynolds number relationships of a plurality of reference porous media (S110), deriving a hydraulic diameter-friction factor-Reynolds number correlation between the hydraulic diameters and the friction factor-Reynolds number relationships (S120), and obtaining permeability of a porous medium to be predicted, by using the hydraulic diameter-friction factor-Reynolds number correlation (S130).

The obtaining of the permeability of the porous medium to be predicted may include the following operations considering a hydraulic diameter or porosity.

Figure 2:
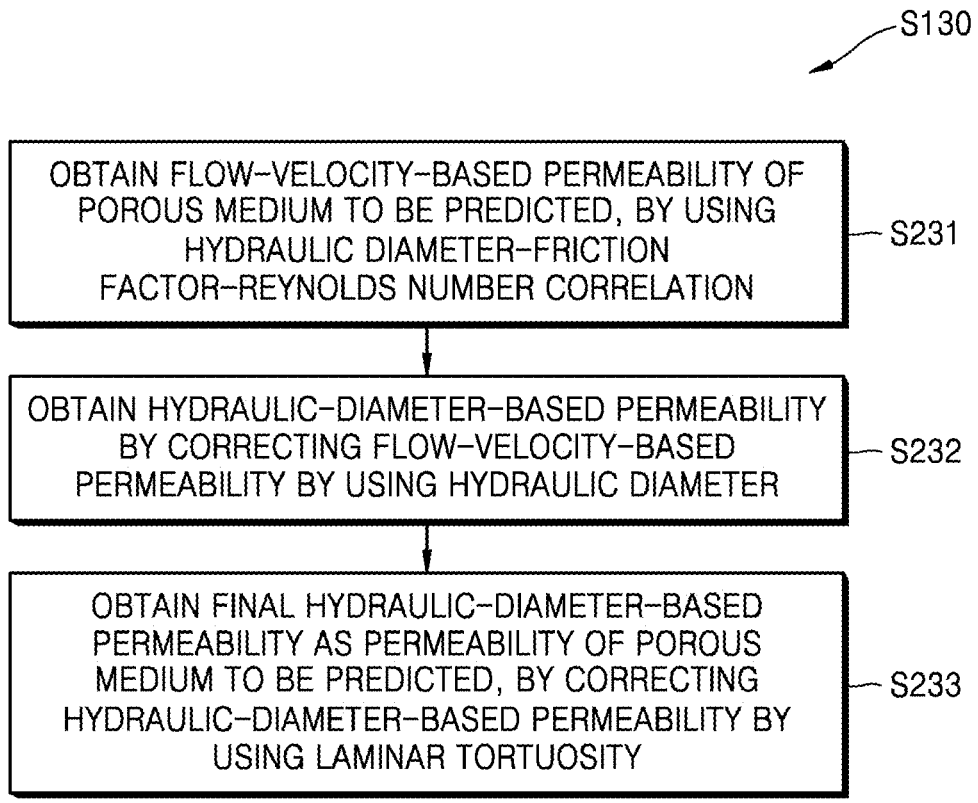
FIG. 2 is a detailed flowchart of the method of calculating the permeability of the porous medium, which is illustrated in FIG. 1, according to an embodiment of the present invention.

FIG. 2 is a detailed flowchart of the method of calculating the permeability of the porous medium, which is illustrated in FIG. 1, according to an embodiment of the present invention.

Referring to FIG. 2, when the hydraulic diameter is considered, the obtaining of the permeability of the porous medium to be predicted (S130) includes obtaining a flow-velocity-based permeability of the porous medium to be predicted, by using the hydraulic diameter-friction factor-Reynolds number correlation (S231), obtaining a hydraulic-diameter-based permeability by correcting the flow-velocity-based permeability by using a hydraulic diameter (S232), and obtaining a final hydraulic-diameter-based permeability as the permeability of the porous medium to be predicted, by correcting the hydraulic-diameter-based permeability by using laminar tortuosity (S233).

The flow-velocity-based permeability may be calculated and obtained using Equation 2(b). The obtaining of the hydraulic-diameter-based permeability may be performed using Equation 3(a). The hydraulic-diameter-based permeability may be calculated and obtained using Equation 5(a). The obtaining of the final hydraulic-diameter-based permeability may be performed using Equation 9(a). The obtaining of the final hydraulic-diameter-based permeability may be performed using Equation 10(a). The obtaining of the final hydraulic-diameter-based permeability may be performed using Equation 11(a). The obtaining of the final hydraulic-diameter-based permeability may be performed using Equation 12(b). The obtaining of the final hydraulic-diameter-based permeability may be performed using Equation 13(b).

Figure 3:
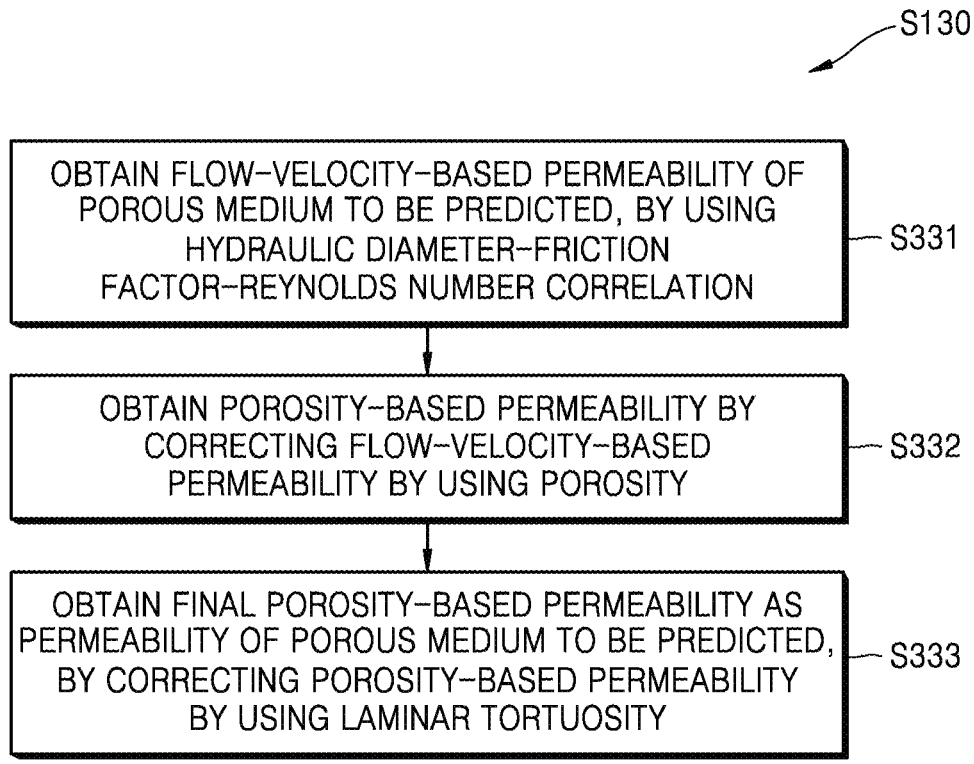
FIG. 3 is another detailed flowchart of the method of calculating the permeability of the porous medium, which is illustrated in FIG. 1, according to an embodiment of the present invention.

FIG. 3 is another detailed flowchart of the method of calculating the permeability of the porous medium, which is illustrated in FIG. 1, according to an embodiment of the present invention.

Referring to FIG. 3, when the porosity is considered, the obtaining of the permeability of the porous medium to be predicted (S130) includes obtaining a flow-velocity-based permeability of the porous medium to be predicted, by using the hydraulic diameter-friction factor-Reynolds number correlation (S331), obtaining a porosity-based permeability by correcting the flow-velocity-based permeability by using porosity (S332), and obtaining a final porosity-based permeability as the permeability of the porous medium to be predicted, by correcting the porosity-based permeability by using laminar tortuosity (S333).

The flow-velocity-based permeability may be calculated and obtained using Equation 2(a). The obtaining of the porosity-based permeability may be performed using Equation 3(b). The porosity-based permeability may be calculated and obtained Equation 5(b). The obtaining of the final porosity-based permeability may be performed using Equation 9(b). The obtaining of the final porosity-based permeability may be performed using Equation 10(b). The obtaining of the final porosity-based permeability may be performed using Equation 11(b).

MODE OF THE INVENTION

The present invention has attempted to define a basic relationship for deriving a correlation between a permeability variation feature and other feature variables of porous flow.

The prior theoretical studies on calculation of rock permeability mostly use interpretative analysis based on relatively easily measured lithological properties (e.g., porosity) (Nelson, 1994). Historically, an initial approach thereto has been made by Hazen (1892) to induce an empirical equation by measuring permeability of sufficiently wet sandstone. Kozeny (1927) and Carman (1937; 1938; 1956) have induced the well-known Kozeny-Carman equation and a semi-empirical and semi-theoretical equation (Muskat, 1946). The Kozeny-Carman equation, the Ergun equation, and other enhanced equations based on the same are representative equations used up to now to calculate permeability (Bear, 1975; Paterson, 1983). Most of these equations have been developed based on capillary tube models, capillary tubes or a plurality of capillary tubes having equivalent flow features have been considered as flow paths through pores of a porous medium (Ingham, D. B. and Pop, I., 1998). However, these equations are aimed to characterize complicated and non-uniform pore paths based on minute geometric factors such as a grain shape, roughness, and a pore size (Rose, 1945; Achdou, 1992). Such approaches are conceptually possible but practically impossible because measurement of sizes, shapes, and distributions of numerous individual porous grains is practically unfeasible. Numerical quantification of the factors for the equations may be a difficult challenge (Burmeister, 1993). As such, a macroscopic approach based on an overall flow loss feature of a porous medium using a Darcy friction factor-Reynolds number relationship f.Re is considered as being more reasonable (Ingham, D. B. and Pop, I., 2002; 2005; Shin & Park, 2016). That is, instead of combining microscopic features of individual pore paths, characterization of overall friction loss of a whole pore network based on various flow loss elements such as tortuosity, reduction, expansion, and divergence is attempted using a friction factor-Reynolds number relationship in a macroscopic point of view.

Such a theoretical approach based on f.Re is applicable not only to laminar flow regions but also to turbulent flow regions (White, 2001). The f.Re value should be the same for conduits having the same shape and structure. Consequently, like the conduit flow, not only general porous media but also hydraulic fractures almost preserving original pore shapes, types, and structures under formation stress changes should have feature variables representative of similarity. Various geometric features and preservation (i.e., similarity) features regardless of flow conditions may be effectively used to calculate permeability of a hydraulic fracture.

Shin (2017) has introduced a generalized Darcy friction flow equation applicable to porous flow analysis and has combined related theories based on the prior studies, which include the Kozeny's hydraulic diameter and the Carman's pore flow velocity based on tortuosity, as shown in Equation 1. Shin has defined friction equivalent permeability (FEP) based on the generalized equation, as shown in Equation 2, which is usable to calculate permeability based on the f.Re value of each medium (Shin, 2017; Shin & Park, 2017). Herein, Equation 1(a) and Equation 2(a) correspond to microscopic definitions based on equivalent pore flow paths, and Equation 1(b) and Equation 2(b) correspond to macroscopic expressions in flow through a porous medium.

[Equation 1]

$$u = -\frac{2D_h^2 \cdot \phi}{\mu \cdot f_v} \frac{T}{Re_v} \frac{\Delta P}{L} \qquad (a)$$

-continued $$u = -\frac{2D_h^2}{\mu \cdot f_u \, Re_u} \frac{\Delta P}{L} \quad (b)$$

where $D_h = \frac{4\,\emptyset}{S_S}$, $S_S = \frac{S}{V_b}$, $S = \pi D_h \cdot L$, $T = \left(\frac{L}{L_e}\right)^2 = \left(\frac{u}{\emptyset v}\right)^2$

[Equation 2]

$$k_{FEP} = \frac{2D_h^2 \cdot \emptyset \, T}{f_v \, Re_v} \quad (a)$$

$$k_{FEP} = \frac{2D_h^2}{f_u \, Re_u} \quad (b)$$

where $f_v = -\left(\frac{2D_h}{\rho v^2}\frac{\Delta P}{L_e}\right)$, $f_u = -\left(\frac{2D_h}{\rho u^2}\frac{\Delta P}{L}\right)$, $Re_v = \frac{\rho v D_h}{\mu}$, $Re_u = \frac{\rho u D_h}{\mu}$, $v = \frac{u}{\emptyset}\left(\frac{L_e}{L}\right)$ In Equation 2, $k_{FEP}$ is permeability, $D_h$ is a hydraulic diameter, φ is porosity of a porous medium, T is tortuosity, $f_u$ is a friction factor based on a flow velocity u, $f_v$ is a friction factor based on the flow velocity v, $Re_u$ is a Reynolds number based on the flow velocity u, and $Re_v$ is a Reynolds number based on the flow velocity v.

Based on Equations 1 and 2, when permeability, a pressure drop, and friction flow feature variables of an arbitrary medium are measured, although a geometric change (e.g., a thickness change) of rock or a flow condition (e.g., laminar flow or turbulent flow) change occurs, the permeability may be approximately calculated. However, in Equations 1 and 2, the f. Re value is not fixed to a constant value and thus a large error occurs as shown in Table 2.

In the present invention, to study a friction feature of porous flow, feature variables shown in Equations 1 and 2 including definitions of a friction factor and a Reynolds number of porous flow are adopted and applied. In particular, a preservation feature of friction flow feature variables will be described and such a feature may be effectively used to calculate permeability of a hydraulic fracture regardless of variations in geometric shapes and flow conditions. To check a friction flow feature and a preservation feature of feature variables, computational fluid dynamics (CFD) simulation was performed on simple hydraulic fractures associated with geometric changes and flow transitions. Finally, it is expected that the verified method may effectively predict permeability variations of a porous medium having continuously changing geometric variables and flow regions, e.g., hydraulic fracture closure.

CFD Simulation of Hydraulic Fractures Having Structurized Microbeads

Five CFD models representing simple-shaped hydraulic fractures, e.g., flat panels filled with five layers of a proppant (microbeads), were constructed. Then, a friction flow loss feature of porous flow was measured using direct numerical simulation (DNS) analysis.

Figure 4:
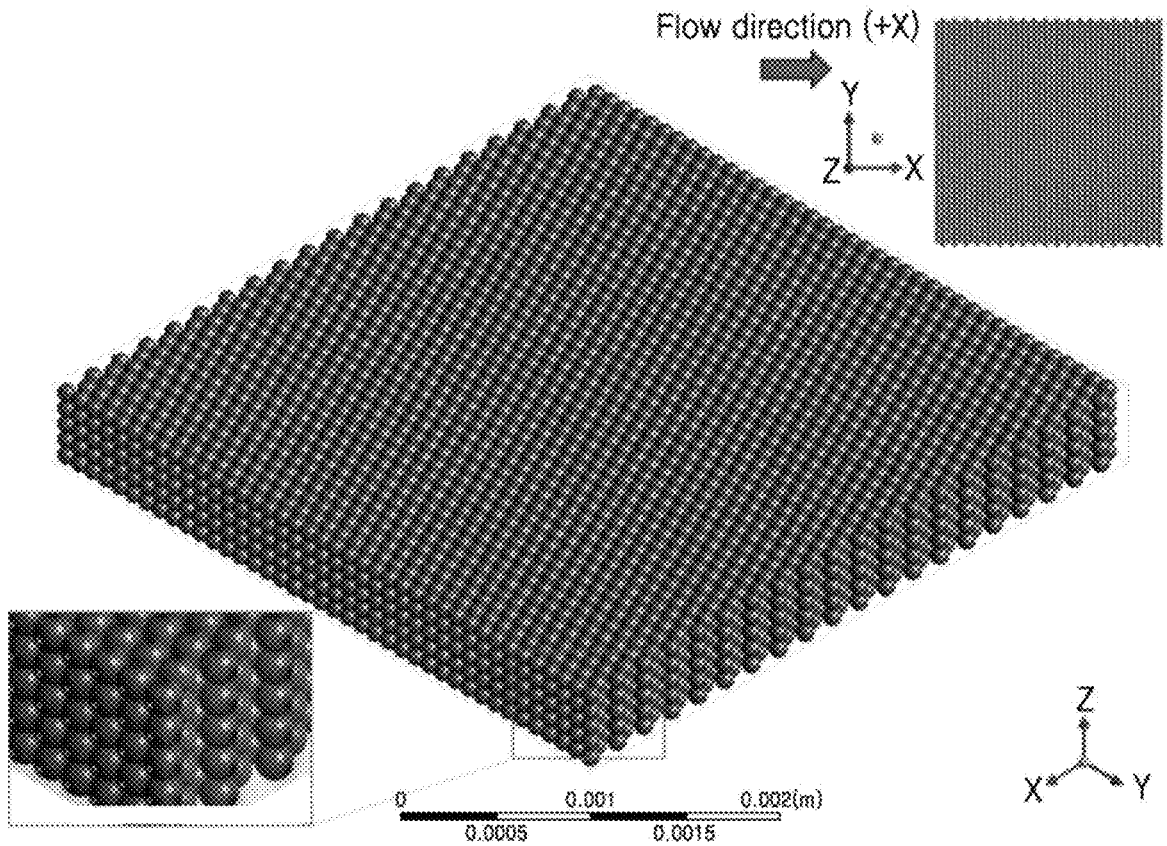
FIG. 4 illustrates a computational fluid dynamics (CFD) simulation model for a method of analyzing flow through a porous medium, according to an embodiment of the present invention.

FIG. 4 illustrates a CFD simulation model for a method of analyzing flow through a porous medium, according to an embodiment of the present invention.

Referring to FIG. 4, horizontal micro flat panels having a length of 4 mm, a width of 4 mm, and a height of 0.5 mm were assumed as simple hydraulic fractures. FIG. 4 is a 3-dimensional perspective view of a "Thickest" model (see FIG. 5) of a simple hydraulic fracture filled with five layers of spherical microbeads. As illustrated in FIG. 4, a total of 7,900 spherical microbeads mimicking proppant grains distributed in the fracture in a zigzag manner were provided between flat panels. The spherical microbeads have a uniform diameter of 0.102 mm. The diameter is a real diameter of the spheres, and parts cut by the flat panels or overlapping with adjacent beads are not considered.

Figure 5:
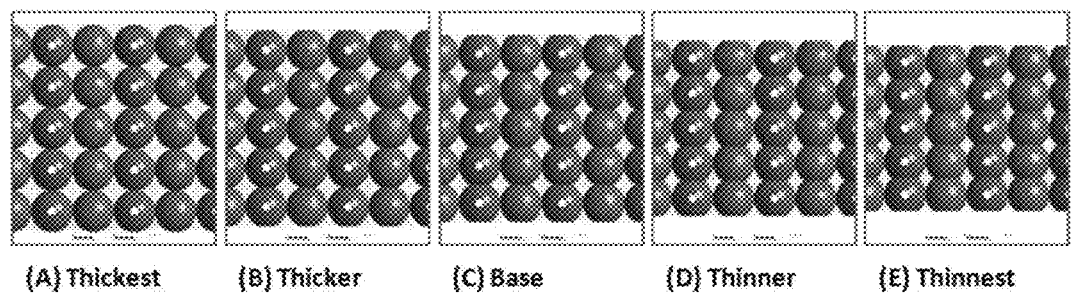
FIG. 5 illustrates models configured by varying the fracture height of the model of FIG. 4, in a method of analyzing flow through a porous medium, according to an embodiment of the present invention.

FIG. 5 illustrates models configured by varying the fracture height of the model of FIG. 4, in a method of analyzing flow through a porous medium, according to an embodiment of the present invention.

Referring to FIG. 5, reductions in the fracture heights (i.e., apertures) of the five models on the basis of a Y-axis direction is geometrically shown. In FIG. 5, (A) is a "Thickest" model, (B) is a "Thicker" model, (C) is a "Base" model, (D) is a "Thinner" model, and (E) is a "Thinnest" model.

These models will now be described in detail. As illustrated in FIG. 4, a 45.2% porous model having a fracture height (i.e., aperture) of 0.5 mm is defined as the "Thickest" model. The "Thicker" model has a fracture height of 0.475 mm, and the "Base" model has a fracture height of 0.45 mm. Herein, as illustrated in FIG. 5, it is assumed that, based on reductions in the apertures due to formation stress changes, beads in each medium are simply and uniformly inserted between neighboring beads and walls. The "Thinner" model has a fracture height of 0.425 mm, and the "Thinnest" model has a fracture height of 0.4 mm.

Main geometric variables such as porosity and a surface area, a total cell count, and a hydraulic diameter calculated based on Equation 1 are shown in Table 1.

Table 1 shows geometric variables, a Kozeny's hydraulic diameter $D_h$, a cell count, etc. of each model of FIG. 5 in a method of analyzing flow through a porous medium, according to an embodiment of the present invention.

TABLE 1

|  | (A) Thickest | (B) Thicker | (C) Base | (D) Thinner | (E) Thinnest |
| --- | --- | --- | --- | --- | --- |
| h [mm] | 0.5 | 0.475 | 0.45 | 0.425 | 0.4 |
| $V_p$ [mm$^3$] | 3.6154 | 3.2433 | 2.9005 | 2.5858 | 2.2973 |
| $A_s$ [mm$^2$] | 286.83 | 271.35 | 256 | 240.77 | 225.66 |
| $S_s$ [mm$^{-1}$] | 35853.75 | 35703.94737 | 35555.55556 | 35407.35294 | 35259.375 |
| Ø | 0.451925 | 0.42675 | 0.402847222 | 0.380264706 | 0.358953125 |
| $D_h$ [m] | 5.04187E−05 | 4.78098E−05 | 4.53203E−05 | 4.29588E−05 | 4.07214E−05 |
| Cell Counts | 113,441,669 | 87,304,720 | 75,773,022 | 67,823,581 | 62,381,776 |

Herein, to check influence of flow velocity (i.e., Reynolds number) changes, five different inlet flow velocity u conditions were applied to each simulation model. The inlet flow velocity u conditions are (a) 0.01 m/s, (b) 0.1 m/s, (c) 1.0 m/s, (d) 5.0 m/s, and (e) 10.0 m/s. The five inlet flow velocities u are perpendicular to an inlet plane (a Y-Z plane) and is parallel to an +X direction as illustrated in an upper right corner of FIG. 4.

In brief, when models having five different fracture heights were applied for each of five different inlet flow velocity conditions (i.e., from laminar flow to turbulent flow), a total of 25 DNS analysis cases were defined. Geometric and flow conditions other than the above-described conditions were equally applied to all cases.

The present invention mainly relates to flow through a hydraulic fracture in a shale gas reservoir, and thus a working fluid was assumed as a pure methane gas having a standard density of 0.6679 kg/m$^3$ and a viscosity of 0.00001087 kg/ms. Solid walls and surfaces of all models were assumed as being completely smooth and the models were assumed as being under the same temperature condition. CFD modeling and simulation were performed under steady state flow conditions by using Ansys-Fluent commercial software (Ansys Co., U.S.), and a convergence condition was set in such a manner that residuals of all momentum and continuity equations are less than $10^{-8}$. Considering that all models had an extremely small dimension (i.e., 4 mm×4 mm×0.5 mm) and had relatively simple and periodic structures, DNS analysis was adopt to consider a turbulent flow feature in flow simulation. As shown in Table 1, a final cell count of a grid system of an unstructured tetrahedron ranges from about 113,441,669 for the "Thickest" model to about 62,381,776 for the "Thinnest" model. In this case, a grid resolution was determined considering available computer performance based on a trial-and-error method. A $2^{nd}$ order upwind scheme and a SIMPLE method were applied for spatial discretization and pressure-velocity coupling, respectively.

The main issue of the present invention is about whether already numerically or experimentally analyzed models are usable to properly predict flow variables of other models among the above-described models, for example, whether flow variables of the "Base" model are predictable using flow variables of the "Thickest" model which is already analyzed and determined. In other words, even with reductions in fracture apertures, all models were derived from their original model, the "Thickest" model. Thus, main geometric features of all models should be very similar. That is, it may be expected that all derived models have flow paths, structures, and sectional shapes very similar to those of their original model. Therefore, when some special feature variables exhibiting similarity or preserving original flow features are specified in each type of a porous medium, the similarity (i.e., preservation) feature variables may be effectively used to predict friction flow features of the medium under different flow or geometric conditions (e.g., aperture reductions). Meanwhile, it is not clear yet whether the preservation features are valid in turbulent flow regions. To check this, frictional flow features in turbulent flow regions will now be measured using the above-described DNS method. In brief, the present invention has conducted qualitative research mostly based on streamline analysis focusing on flow pattern changes and tortuosity calculation, and then has quantitatively analyzed friction flow features of each model.

Figure 6:
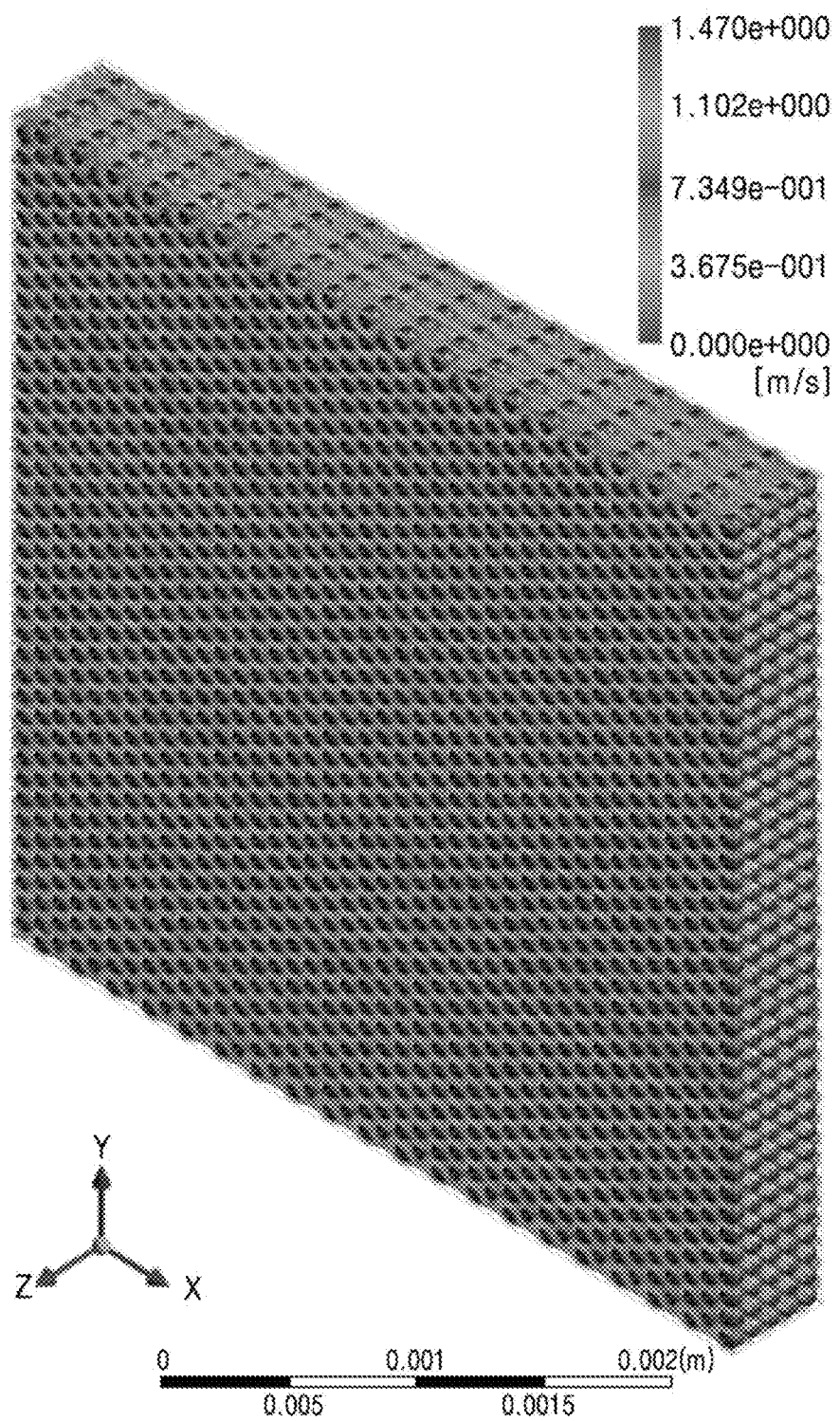
FIG. 6 illustrates an overall streamline distribution of a "Thickest" model of FIG. 5, in a method of analyzing flow through a porous medium, according to an embodiment of the present invention.

FIG. 6 illustrates an overall streamline distribution of the "Thickest" model of FIG. 5, in a method of analyzing flow through a porous medium, according to an embodiment of the present invention.

Figure 7:
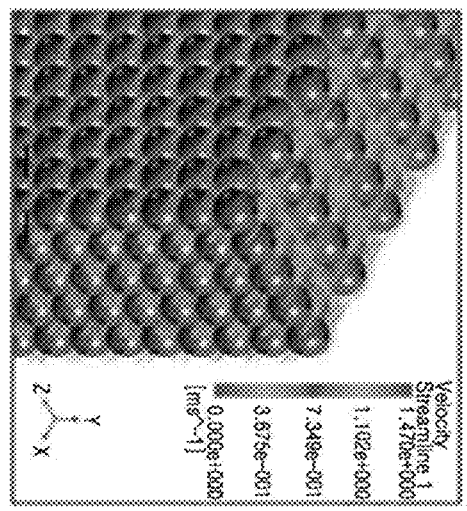
FIG. 7 illustrates magnified partial streamline distributions of five direct numerical simulation (DNS) models of FIG. 5, in a method of analyzing flow through a porous medium, according to an embodiment of the present invention.
Figure 7:
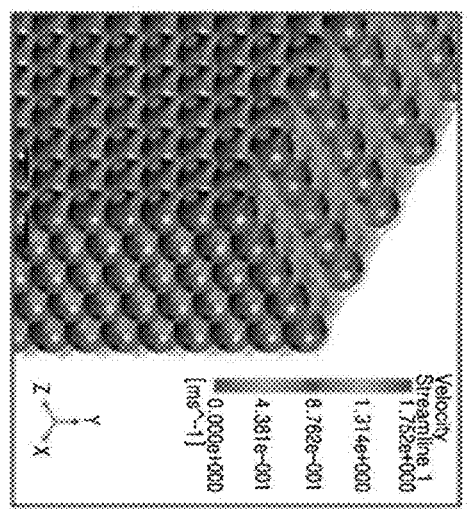
Figure 7:
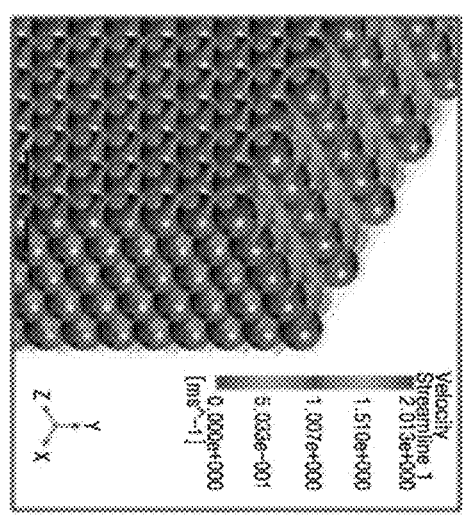
Figure 7:
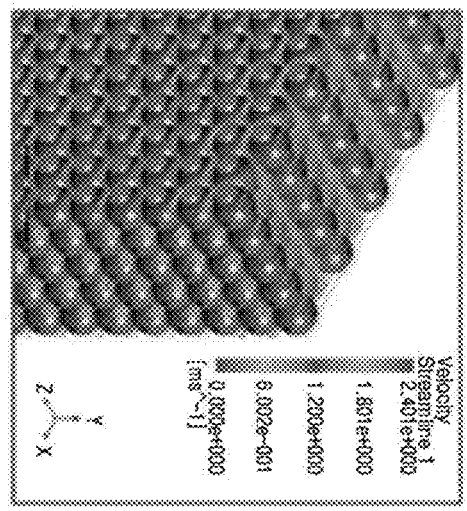
Figure 7:
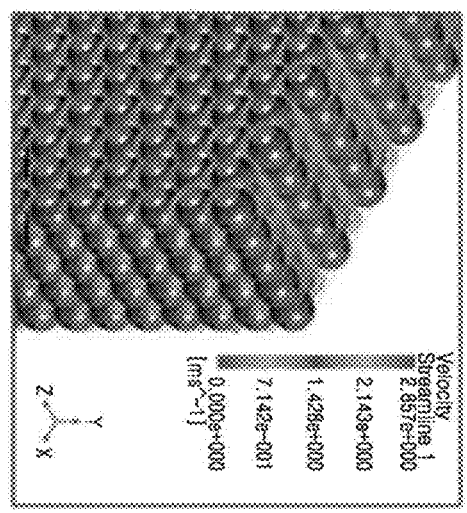

FIG. 7 illustrates magnified partial streamline distributions of the five DNS models of FIG. 5, in a method of analyzing flow through a porous medium, according to an embodiment of the present invention.

In FIGS. 6 and 7, streamline distributions of models having five different fracture heights (i.e., the apertures illustrated in FIG. 5) are shown based on DNS results obtained under an inlet flow velocity condition of 0.1 m/s. Herein, streamlines of every fracture model were generated based on 100,000 streamline seeds in very small individual pore spaces of each fracture thickness model.

Referring to FIGS. 6 and 7, initially, very smooth and continuous streamlines are shown in all fracture thickness models under the same flow velocity condition. Such a result is shown in both of the full view (FIG. 6) and the magnified view (FIG. 7(A)) of the "Thickest" model. Such a pattern is also seen from the other models as illustrated in FIG. 7. All flows of FIG. 7 correspond to laminar flow regions, and the above result means that streamlines in these regions are very smooth and continuous. This may also be verified in terms of preservation of permeability of each model as described below.

Even with fracture height changes, flow structures and sectional distribution shapes of main flow paths of the models were very similar. The only difference observed in FIG. 7 is merely that the number of streamlines is slightly reduced due to reductions in sectional areas of pore paths based on aperture reductions. Thus, as expected, it is shown that main structures and shapes of flow paths through a porous medium are qualitatively almost preserved.

Figure 8:
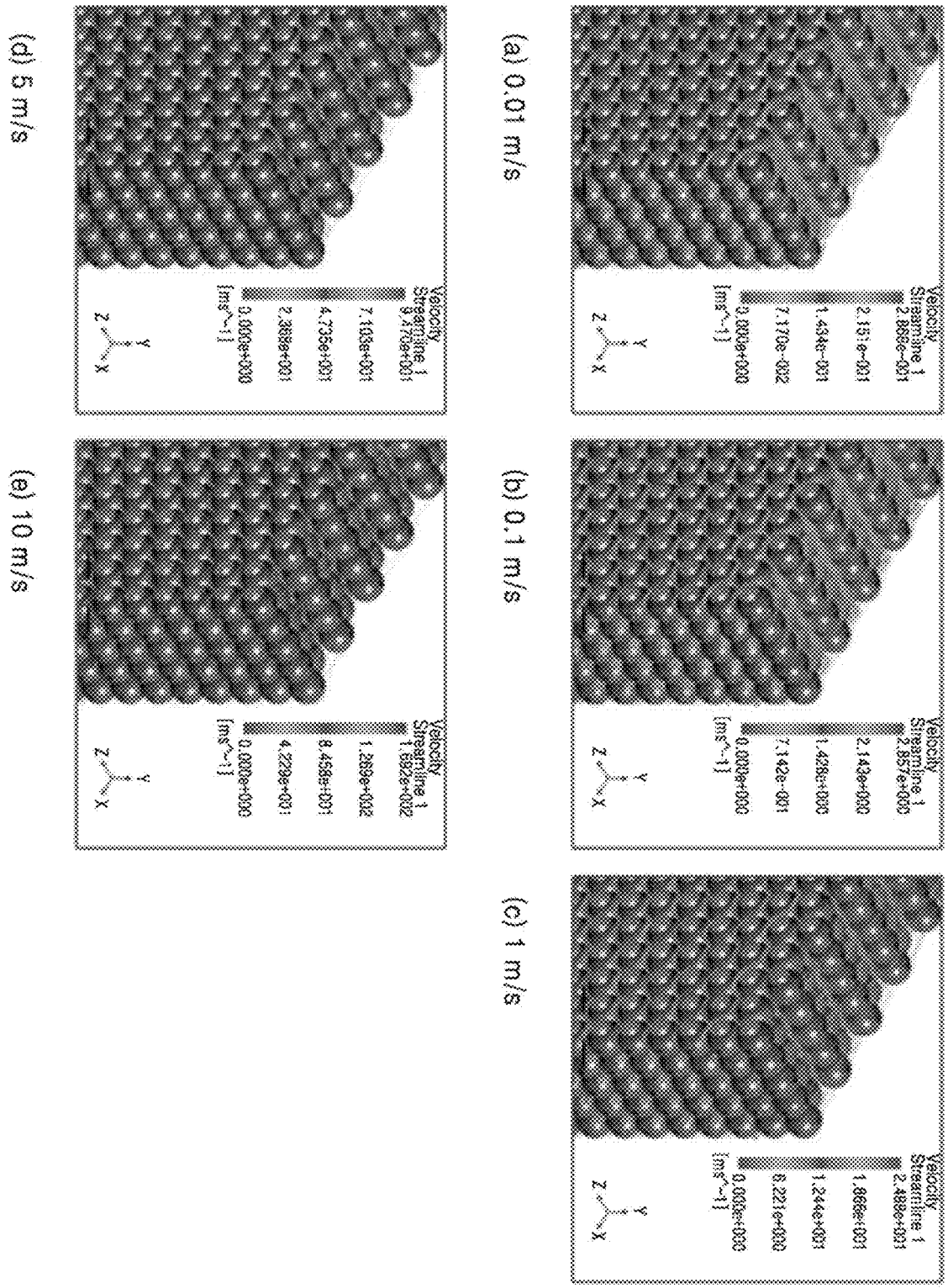
FIG. 8 illustrates magnified partial streamline distributions of a "Thinnest" model of FIG. 5 based on changes in an inlet flow velocity, in a method of analyzing flow through a porous medium, according to an embodiment of the present invention.

FIG. 8 illustrates magnified partial streamline distributions of the "Thinnest" model of FIG. 5 based on changes in an inlet flow velocity, in a method of analyzing flow through a porous medium, according to an embodiment of the present invention.

Figure 9:
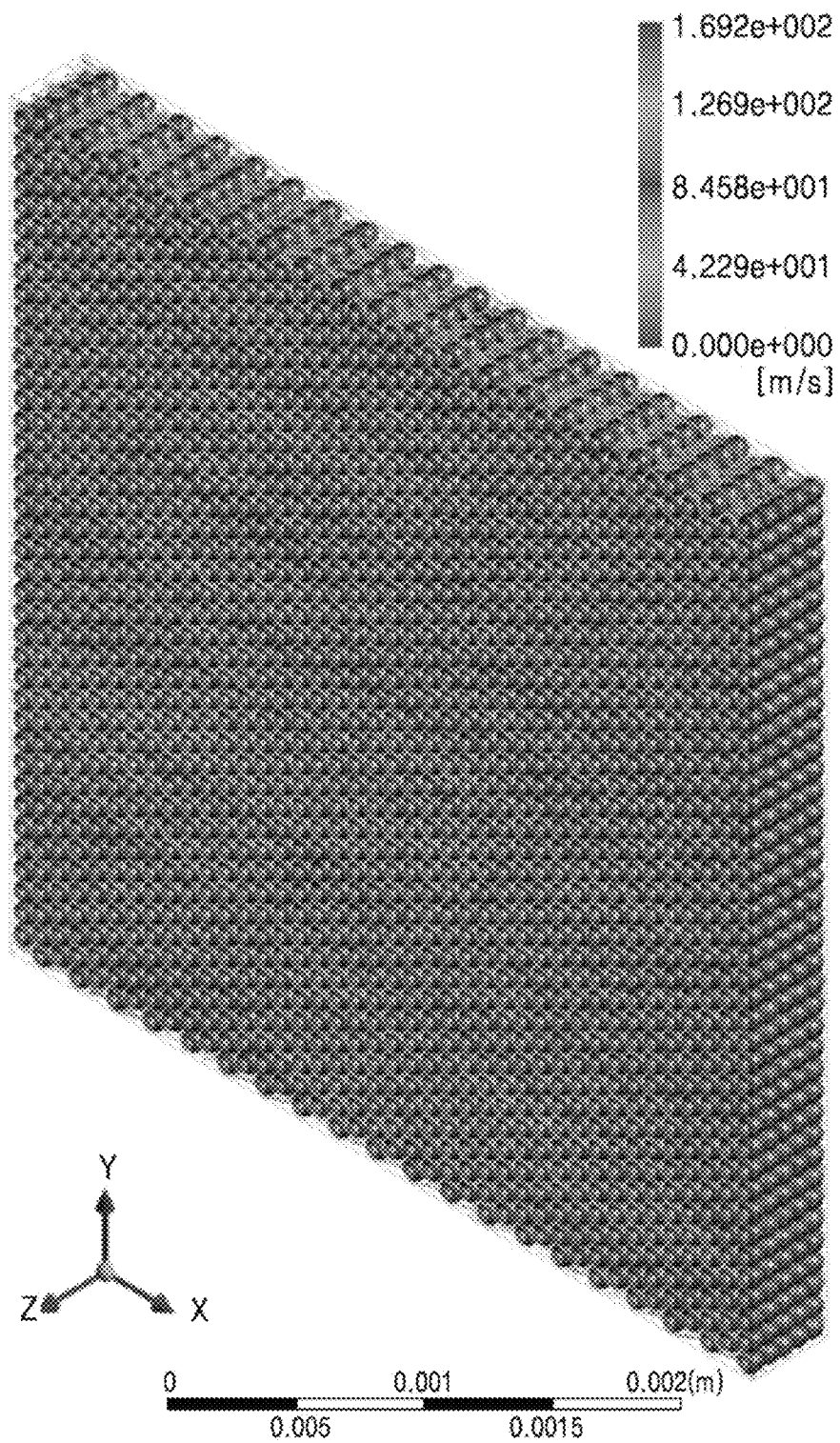
FIG. 9 illustrates an overall streamline distribution of the "Thinnest" model of FIG. 5 at an inlet flow velocity of 10.0 m/s, in a method of analyzing flow through a porous medium, according to an embodiment of the present invention.

FIG. 9 illustrates an overall streamline distribution of the "Thinnest" model of FIG. 5 at an inlet flow velocity of 10.0 m/s, in a method of analyzing flow through a porous medium, according to an embodiment of the present invention.

Referring to FIGS. 8 and 9, it is shown that flows are changed from a laminar flow to a turbulent flow as the inlet flow velocity is increased. Distinctively, unlike the result of FIG. 7, some streamlines are neither smooth nor continuous. FIG. 8(*a*) and FIG. 8(*b*) show continuous and smooth streamlines and these results correspond to laminar flow regions. However, streamlines of FIG. 8(*c*) show transitions, and streamlines of FIG. 8(*d*) and FIG. 8(*e*) show quite different behaviors. As the flow velocity is increased, the number of streamlines is rapidly reduced and continuity is also rapidly reduced. The flows start to be transited before or under the flow velocity condition of 1.0 m/s of FIG. 8(*c*), and are totally changed to turbulent flows under the flow velocity condition of 5.0 m/s of FIG. 8(*d*) and the flow velocity condition of 10.0 m/s of FIG. 8(*e*) and FIG. 9. Such a pattern is equally seen from not only the "Thinnest" model but also the other models illustrated in FIG. 8. Thus, it is shown that streamline reductions and flow discontinuity in laminar and turbulent flow regions of a porous medium are rapidly increased. It may be inferred that tortuosity values calculated using an internal flow velocity v (i.e., an average flow velocity through pore paths in a medium) based on streamline analysis can be very inaccurate due to the increase in flow discontinuity and streamline reductions in the laminar and turbulent flow regions.

The results of FIGS. 6 to 9 show that structures and shapes of porous flows are almost preserved regardless of aperture changes but tortuosity cannot be properly calculated using only streamline analysis due to streamline reductions and discontinuity in laminar and turbulent flow regions.

Description and Application of Friction Flow Features of FEP Relationship

The present invention has expected that a particular feature variable (e.g., f. Re) may be directly associated with similarity in structures and shapes of main flow paths through an arbitrarily given porous medium. As described above, such a relationship should not be greatly influenced by variations in basic geometric variables such as porosity or an aperture. To quantitatively verify such an assumption, changes in friction flow features and friction feature variables based on flow regions and aperture changes have been checked based on the above-described DNS results.

Feature variables of friction flows, which are calculated based on the above-described DNS analysis results, are shown in Tables 2 to 6. Herein, tortuosity T, a friction factor, and a Reynolds number are calculated based on Equations 1 and 2.

Tables 2 to 6 show friction flow feature variables calculated based on DNS results of the models of FIG. 5, in a method of analyzing flow through a porous medium, according to an embodiment of the present invention.

Table 2 shows a case in which an inlet flow velocity u is 0.01 m/s, Table 3 shows a case in which the inlet flow velocity u is 0.1 m/s, Table 4 shows a case in which the inlet flow velocity u is 1.0 m/s, Table 5 shows a case in which the inlet flow velocity u is 5.0 m/s, and Table 6 shows a case in which the inlet flow velocity u is 10.0 m/s.

In Tables 2 to 6, (A) indicates the "Thickest" model, (B) indicates the "Thicker" model, (C) indicates the "Base" model, (D) indicates the "Thinner" model, and (E) indicates the "Thinnest" model. ΔP is an area-averaged pressure difference between inlet and outlet sections of each model, v is a length-averaged streamline velocity of each model, k is a real permeability value calculated based on the DNS results, and T, $F_v$, $Re_v$, $f_u$, and $Re_u$ are calculated based on Equations 1 and 2.

TABLE 2

|     | ΔP [Pa] | v [m/s] | T | k [D] | $Re_u$ | $Re_v$ | $f_u$ | $f_v$ | $f_u Re_u$ | $f_v Re_v$ |
|-----|---------|---------|---|-------|--------|--------|-------|-------|-----------|-----------|
| (A) | 24.0688 | 0.0390 | 0.3222 | 18.0649 | 0.0310 | 0.1208 | 9084.5783 | 339.2619 | 281.4352 | 40.9741 |
| (B) | 31.1620 | 0.0419 | 0.3123 | 13.9529 | 0.0294 | 0.1232 | 11153.2432 | 354.4717 | 327.6426 | 43.6646 |
| (C) | 40.7256 | 0.0455 | 0.2978 | 10.6763 | 0.0278 | 0.1267 | 13817.1651 | 364.4754 | 384.7634 | 46.1650 |
| (D) | 53.9996 | 0.0500 | 0.2769 | 8.0519 | 0.0264 | 0.1319 | 17366.0742 | 365.8210 | 458.3910 | 48.2598 |
| (E) | 72.7180 | 0.0552 | 0.2551 | 5.9793 | 0.0250 | 0.1380 | 22167.8517 | 368.0647 | 554.6623 | 50.7945 |

TABLE 3

|     | ΔP [Pa] | v [m/s] | T | k [D] | $Re_u$ | $Re_v$ | $f_u$ | $f_v$ | $f_u Re_u$ | $f_v Re_v$ |
|-----|---------|---------|---|-------|--------|--------|-------|-------|-----------|-----------|
| (A) | 241.0850 | 0.3922 | 0.3183 | 18.0351 | 0.3098 | 1.2150 | 909.9563 | 33.3750 | 281.8994 | 40.5514 |
| (B) | 312.1510 | 0.4232 | 0.3065 | 13.9292 | 0.2938 | 1.2433 | 1117.2248 | 34.5303 | 328.2009 | 42.9328 |
| (C) | 407.9760 | 0.4600 | 0.2912 | 10.6575 | 0.2785 | 1.2809 | 1384.1593 | 35.3056 | 385.4436 | 45.2222 |
| (D) | 541.0050 | 0.5041 | 0.2721 | 8.0369 | 0.2640 | 1.3307 | 1739.8523 | 35.7139 | 459.2475 | 47.5228 |
| (E) | 728.6110 | 0.5568 | 0.2503 | 5.9675 | 0.2502 | 1.3933 | 2221.1475 | 35.8368 | 555.7538 | 49.9311 |

TABLE 4

|     | ΔP [Pa] | v [m/s] | T | k [D] | $Re_u$ | $Re_v$ | $f_u$ | $f_v$ | $f_u Re_u$ | $f_v Re_v$ |
|-----|---------|---------|---|-------|--------|--------|-------|-------|-----------|-----------|
| (A) | 2653.8700 | 4.3736 | 0.2560 | 16.3836 | 3.0979 | 13.5492 | 100.1682 | 2.6494 | 310.3156 | 35.8968 |
| (B) | 3436.7800 | 4.7235 | 0.2461 | 12.6514 | 2.9376 | 13.8759 | 123.0064 | 2.7351 | 361.3489 | 37.9515 |
| (C) | 4492.4400 | 5.1372 | 0.2335 | 9.6785 | 2.7847 | 14.3055 | 152.4171 | 2.7907 | 424.4324 | 39.9220 |
| (D) | 5960.7800 | 5.5395 | 0.2254 | 7.2943 | 2.6396 | 14.6219 | 191.6965 | 2.9656 | 505.9978 | 43.3632 |
| (E) | 8035.6400 | 5.9655 | 0.2181 | 5.4109 | 2.5021 | 14.9263 | 244.9639 | 3.2146 | 612.9248 | 47.9816 |

TABLE 5

|     | ΔP [Pa] | v [m/s] | T | k [D] | $Re_u$ | $Re_v$ | $f_u$ | $f_v$ | $f_u Re_u$ | $f_v Re_v$ |
|-----|---------|---------|---|-------|--------|--------|-------|-------|-----------|-----------|
| (A) | 22439.1000 | 21.2920 | 0.2700 | 9.6884 | 15.4897 | 65.9614 | 33.8778 | 0.9708 | 524.7584 | 64.0325 |
| (B) | 28876.9000 | 22.3831 | 0.2740 | 7.5285 | 14.6882 | 65.7536 | 41.3415 | 1.0798 | 607.2333 | 71.0038 |
| (C) | 37582.8000 | 23.7379 | 0.2734 | 5.7846 | 13.9234 | 66.1024 | 51.0036 | 1.1832 | 710.1423 | 78.2097 |
| (D) | 49861.2000 | 23.6024 | 0.3104 | 4.3601 | 13.1979 | 62.3004 | 64.1407 | 1.6036 | 846.5221 | 99.9033 |
| (E) | 67519.3000 | 23.2749 | 0.3582 | 3.2198 | 12.5105 | 58.2362 | 82.3322 | 2.2739 | 1030.0176 | 132.4254 |

TABLE 6

|     | ΔP [Pa] | v [m/s] | T | k [D] | $Re_u$ | $Re_v$ | $f_u$ | $f_v$ | $f_u Re_u$ | $f_v Re_v$ |
|-----|---------|---------|---|-------|--------|--------|-------|-------|-----------|-----------|
| (A) | 65956.9000 | 41.6693 | 0.2820 | 6.5922 | 30.9794 | 129.0892 | 24.8949 | 0.7614 | 771.2306 | 98.2846 |
| (B) | 83196.1000 | 40.1890 | 0.3400 | 5.2262 | 29.3764 | 118.0610 | 29.7769 | 1.0749 | 874.7380 | 126.9083 |

TABLE 6-continued

|   | ΔP [Pa] | v [m/s] | T | k [D] | $Re_u$ | $Re_v$ | $f_u$ | $f_v$ | $f_u Re_u$ | $f_v Re_v$ |
|---|---|---|---|---|---|---|---|---|---|---|
| (C) | 105619.0000 | 37.8807 | 0.4294 | 4.1167 | 27.8468 | 105.4855 | 35.8339 | 1.6364 | 997.8570 | 172.6203 |
| (D) | 138861.0000 | 32.8988 | 0.6390 | 3.1312 | 26.3958 | 86.8389 | 44.6572 | 3.2981 | 1178.7612 | 286.4044 |
| (E) | 188537.0000 | 33.1380 | 0.7068 | 2.3062 | 25.0210 | 82.9147 | 57.4749 | 4.4001 | 1438.0808 | 364.8320 |

Referring to Tables 2 to 6, a pressure drop ΔP and an internal flow velocity v through each pore flow path are naturally increased based on an aperture reduction. On the other hand, permeability k and tortuosity are reduced based on a fracture height (i.e., aperture) reduction. In this case, it is notable that the permeability is very rapidly reduced due to a small reduction in the aperture. The permeability is reduced by almost 300% due to an aperture reduction of about 10%.

As shown in Tables 2 and 3, since the permeability values of the models are almost constant for laminar flow regions, it is shown that the "thickest" model and the "thicker" model are in the laminar flow regions among the flow velocity conditions. In Table 4, the permeability values of the models start to be slightly inconstant. This means that the flows start to be transited under such flow velocity conditions. Due to additional velocity increases, each flow shows a turbulent flow behavior as shown in Tables 5 and 6. This phenomenon agrees well with the above-described qualitative observation results of streamline distributions. However, it may be observed herein that f.Re values (i.e., both $f_u \cdot Re_u$ and $f_v \cdot Re_v$) are not constantly maintained for the fracture height models under each flow condition. Although a change in the $f_v \cdot Re_v$ value calculated using each model is much less than the change in the permeability, the calculated result is different from the earlier expected result.

In terms of fluid dynamics, friction features of porous flows should not be specified as apparent flow variables such as an average inlet flow velocity u through a porous medium but should be specified as real flow variables such as an average internal flow velocity v through pore flow paths in each medium. Thus, even when flow paths are geometrically slightly changed due to a reduction in an fracture aperture, it may be expected that f.Re values based on real pore flow variables (i.e., $f_v \cdot Re_v$) representing real friction flow features will be almost preserved. However, referring to Tables 2 to 6, it is shown that such quantitative changes are not small at all. Thus, it is shown that basic $f_v \cdot Re_v$ values are changed due to geometric changes of media. Therefore, it is determined such values are not directly used as similarity (i.e., preservation) feature variables in porous flow analysis because changes in sectional shapes and tortuosity are mainly caused by aperture reductions although the changes are very small. Herein, it is noted that friction flow features of general conduits such as cylindrical pipes or square ducts may be generally specified based on hydraulic diameters and f.Re value relationships.

In particular, when permeability is calculated based on Equations 1 and 2, as shown in Tables 2 to 6, the f.Re values are not complexly fixed to constants and thus large errors occur. That is, the f.Re values may be constant regardless of thickness changes in the laminar flow regions but are not constant in turbulent flow regions.

As such, special relationships defined by Equation 3(a) representing a relationship between hydraulic diameters and f.Re values and Equation 3(b) representing a relationship between porosity and f.Re values need to be additionally considered. Consequently, two modified f.Re values (i.e., $f \cdot Re_{D_h}$ and $f_v \cdot Re_\varphi$) shown in Equation 3 are additionally defined and are adopted to analyze each model.

[Equation 3]

$$fRe_{D_h} \equiv f_v Re_v \times D_h{}^n = f_u Re_u \times D_h{}^n \times \varphi T \quad (a)$$

where $f_v Re_v = f_u Re_u \times \varphi T$ $$fRe_\varphi \equiv f_v Re_v \times \varphi^n = f_u Re_u \times \varphi^n \times \varphi T \quad (b)$$

where $f_v Re_v = f_u Re_u \times \varphi T$

In Equation 3, $f \cdot Re_{D_h}$ is a friction factor-Reynolds number relationship based on a hydraulic diameter, $f \cdot Re_\varphi$ is a friction factor-Reynolds number relationship based on porosity, $f_u$ is a friction factor based on a flow velocity u, $f_v$ is a friction factor based on a flow velocity v, $Re_u$ is a Reynolds number based on the flow velocity u, $Re_v$ is a Reynolds number based on the flow velocity v, $D_h$ is a hydraulic diameter, φ is porosity of a porous medium, and T is tortuosity.

Table 7 shows f.Re values of the models after an exponent value n of Equation 3 is set to be "1", in a method of analyzing flow through a porous medium, according to an embodiment of the present invention.

TABLE 7

|   | f $Re_{Dh}$ (n = 1) | | | | | f $Re_\varphi$ (n = 1) | | | | |
|---|---|---|---|---|---|---|---|---|---|---|
|   | (a) | (b) | (c) | (d) | (e) | (a) | (b) | (c) | (d) | (e) |
| (A) | 0.00207 | 0.00204 | 0.00181 | 0.00323 | 0.00496 | 1.85E+01 | 1.83E+01 | 1.62E+01 | 2.89E+01 | 4.44E+01 |
| (B) | 0.00209 | 0.00205 | 0.00181 | 0.00339 | 0.00607 | 1.86E+01 | 1.83E+01 | 1.62E+01 | 3.03E+01 | 5.42E+01 |
| (C) | 0.00209 | 0.00205 | 0.00181 | 0.00354 | 0.00782 | 1.86E+01 | 1.82E+01 | 1.61E+01 | 3.15E+01 | 6.95E+01 |
| (D) | 0.00207 | 0.00204 | 0.00186 | 0.00429 | 0.01230 | 1.84E+01 | 1.81E+01 | 1.65E+01 | 3.80E+01 | 1.09E+01 |
| (E) | 0.00207 | 0.00203 | 0.00195 | 0.00539 | 0.01486 | 1.82E+01 | 1.79E+01 | 1.72E+01 | 4.75E+01 | 1.31E+01 |

In Table 7, (A) indicates the "Thickest" model, (B) indicates the "Thicker" model, (C) indicates the "Base" model, (D) indicates the "Thinner" model, and (E) indicates the "Thinnest" model. As the inlet flow velocity u, (a) indicates 0.01 m/s, (b) indicates 0.1 m/s, (c) indicates 1.0 m/s, (d) indicates 5.0 m/s, and (e) indicates 10.0 m/s.

A left side of Table 7 shows modified f.Re values calculated based on hydraulic diameters of the models under each flow condition. Specifically, the left side of Table 7 shows $f \cdot Re_{Dh}$ values at n=1. Herein, it needs to be noted that the $f \cdot Re_{Dh}$ values are fixed to almost constant values in laminar flow regions. Although slightly changed compared to the values in the laminar flow regions, the $f \cdot Re_{Dh}$ values are almost preserved in transitional flow regions. This result means that the f.Re$_{Dh}$ values are usable as similarity (i.e., preservation) feature variables in at least the laminar flow regions, and thus is significant in porous flow analysis. In this case, the hydraulic diameter is a function of porosity and a specific surface area, and the specific surface area values of the fracture height models are almost preserved as shown in Table 1. Thus, assuming the constant specific surface areas, the f.Re values modified based on the porosity (specifically, the f.Re$_\varphi$ values at n=1) should also be almost preserved. Such a result is shown in a right side of Table 3. Therefore, it is regarded that the f.Re$_\varphi$ values are also usable as similarity (preservation) feature variables. Consequently, the generalized Darcy friction flow equation of Equation 1 and the FEP equation of Equation 2 may be respectively expressed as generalized equations such as Equations 4 and 5 by defining f.Re$_{Dh}$ and f.Re$_\varphi$ as shown in Equation 3.

[Equation 4]

$$u = -\frac{2D_h^{n+2} \cdot \varphi \, T}{\mu \cdot f \, Re_{D_h}} \frac{\Delta P}{L} \quad (a)$$

$$u \cong -\frac{2D_h^2 \cdot \varphi^{n+1} \, T}{\mu \cdot f \, Re_\varphi} \frac{\Delta P}{L} \quad (b)$$

[Equation 5]

$$k_{FEP} = \frac{2D_h^{n+2} \cdot \varphi \, T}{f \, Re_{D_h}} \quad (a)$$

$$k_{FEP} \cong \frac{2D_h^2 \cdot \varphi^{n+1} \, T}{f \, Re_\varphi} \quad (b)$$

In Equation 5, k$_{FEP}$ is permeability, D$_h$ is a hydraulic diameter, φ is porosity of a porous medium, T is tortuosity, f.Re$_{Dh}$ is a friction factor-Reynolds number relationship based on a hydraulic diameter, and f.Re$_\varphi$ is a friction factor-Reynolds number relationship based on porosity.

In Equations 4 and 5, f.Re$_{Dh}$ and f.Re$_\varphi$ have constant values for the same medium in the laminar flow regions.

Equations 4 and 5 may have a significant meaning because the modified f.Re values of each equation are fixed to constant values in at least the laminar flow regions. As such, permeability of a porous medium may always have a fixed constant value regardless of a fracture aperture reduction and a flow velocity change under a laminar flow condition. Herein, an interesting part is that a velocity of porous flow is correlated with the cube of a hydraulic diameter in addition to porosity and tortuosity variables. On the other hand, in an original equation for general conduit flow, a velocity of porous flow is correlated with the square of a hydraulic diameter as shown in Equation 1.

Nevertheless, the results of Tables 2 to 6 include slightly abnormal and illogical parts. Initially, as shown in Tables 5 and 6, apertures are reduced but tortuosity values are increased in the turbulent flow regions. Such increases in the tortuosity physically impossible and unrealistic because the velocity of internal flow through real pore flow paths should be increased as the aperture is reduced under the average inlet flow velocity u condition of the same medium, and the tortuosity values should be reduced due to the fracture aperture reductions based on the definition of tortuosity of Equation 1. Such a problem is regarded as a result of calculating the tortuosity based on an average streamline velocity value in Tables 2 to 6. In Tables 2 to 6, the average streamline velocity is adopted to represent the average internal flow velocity v through tortuous real pore flow paths. Actually, the average streamline velocity is the only variable usable to explain detouring and complicated flow paths through tortuous pores, but may be properly calculated only in the laminar flow regions as described above. In this case, as described above, streamline-based average flow velocities in the laminar and turbulent flow regions may not properly represent tortuosity features of flow due to discontinuity of streamlines and a reduction in a distribution area and the number of the streamlines. As such, in Tables 2 to 6, the tortuosity values based on the average streamline velocities in the transitional and turbulent flow regions may be small or inaccurate. Therefore, the tortuosity values of porous media should be calculated using the average streamline velocity values in the laminar flow regions. In other words, the tortuosity is a variable representing geometric features, and should be set as a value representative of unique geometric features of each porous medium regardless of the flow regions.

Then, referring to Tables 4 to 6, it is shown that the tortuosity values are reduced in the transitional flow regions as the inlet flow velocities are increased (i.e., see Table 4), and are increased in the turbulent flow regions in the turbulent flow regions where the flow velocities are increased (i.e., see Tables 5 and 6). Such a result is also unrealistic because the tortuosity is a variable representative of geometric features and thus should be equal for media of the same type regardless of flow condition changes. Moreover, changes from the laminar flow regions to the transitional flow regions and changes from the transitional flow regions to the turbulent flow regions should be of at least the same pattern. Such a contradiction may be caused for the same reason described above, for example, by an increase in discontinuity of streamlines and a reduction in a distribution area and the number of the streamlines. Consequently, to constantly maintain the tortuosity values of the fracture models, the tortuosity values in the laminar flow regions (T=T*=T$_{(a)}$) may be used in the laminar and turbulent flow regions. In other words, this means that the tortuosity values at the inlet flow velocity u of 0.01 m/s in Table 2 are used. Results obtained using two types of modified f.Re values and tortuosity correction (f.Re$_{Dh}$* and f.Re$_\varphi$*, namely, f.Re values modified based on tortuosity correction) are shown in Table 8, and definitions thereof are shown in Equation 6.

[Equation 6]

$$f\text{Re}^*_{D_h} = f\text{Re}_{D_h} \quad (a)$$

$$f\text{Re}^*_\varphi = f\text{Re}_\varphi \, (T=T^*=T_{(a)}) \quad (b)$$

Table 8 shows corrected f.Re values of the models after an exponent value n of Equation 3 is set to be "1", in a method of analyzing flow through a porous medium, according to an embodiment of the present invention.

TABLE 8

| T* | f Re*$_{Dh}$ (n = 1) | | | | | f Re*$_\phi$ (n = 1) | | | | |
|---|---|---|---|---|---|---|---|---|---|---|
| | (a) | (b) | (c) | (d) | (e) | (a) | (b) | (c) | (d) | (e) |
| (A) 0.3222 | 0.00207 | 0.00207 | 0.00228 | 0.00385 | 0.00566 | 1.85E+01 | 1.84E+01 | 2.04E+01 | 3.45E+01 | 5.07E+01 |
| (B) 0.3123 | 0.00209 | 0.00209 | 0.00230 | 0.00387 | 0.00557 | 1.86E+01 | 1.85E+01 | 2.06E+01 | 3.45E+01 | 4.97E+01 |
| (C) 0.2978 | 0.00209 | 0.00210 | 0.00231 | 0.00386 | 0.00543 | 1.86E+01 | 1.84E+01 | 2.05E+01 | 3.43E+01 | 4.82E+01 |
| (D) 0.2769 | 0.00207 | 0.00208 | 0.00229 | 0.00383 | 0.00533 | 1.84E+01 | 1.82E+01 | 2.03E+01 | 3.39E+01 | 4.72E+01 |
| (E) 0.2551 | 0.00207 | 0.00207 | 0.00229 | 0.00384 | 0.00536 | 1.82E+01 | 1.81E+01 | 2.01E+01 | 3.39E+01 | 4.73E+01 |

In Table 8, (A) indicates the "Thickest" model, (B) indicates the "Thicker" model, (C) indicates the "Base" model, (D) indicates the "Thinner" model, and (E) indicates the "Thinnest" model. As the inlet flow velocity u, (a) indicates 0.01 m/s, (b) indicates 0.1 m/s, (c) indicates 1.0 m/s, (d) indicates 5.0 m/s, and (e) indicates 10.0 m/s.

A left side of Table 8 shows modified f.Re values calculated based on tortuosity correction and hydraulic diameters (i.e., f.Re$_{Dh}$*) of the models under each flow condition. Initially, the f.Re$_{Dh}$* values are not only fixed to constant values in laminar flow regions but also almost preserved as unique constant values in transitional and turbulent flow regions regardless of fracture aperture changes. A right side of Table 8 shows f.Re values modified based on tortuosity correction and porosity (i.e., f.Re$_\phi$*), and the f.Re$_\phi$* values show a pattern almost similar to that of the f.Re$_{Dh}$* values. This has a significant meaning because both f.Re$_{Dh}$* and f.Re$_\phi$* values may be expressed as similarity (i.e., preservation) feature variables of porous flow with respect to geometric variations of media regardless of flow region changes. Eventually, the generalized Darcy friction flow equation of Equation 1 may be completely modified as shown in Equations 7 and 8 by using the similarity feature variables of f.Re$_{Dh}$* and f.Re$_\phi$*. The FEP equation of Equation 2 may be modified to Equations 9 and 10 by using the above-described similarity feature variables.

[Equation 7]

$$u = -\frac{2D_h^{n+2} \cdot \phi \, T}{\mu \cdot f \, Re_{D_h}^*} \frac{\Delta P}{L} \quad (a)$$

$$u \cong -\frac{2D_h^2 \cdot \phi^{n+1} \, T}{\mu \cdot f \, Re_\phi^*} \frac{\Delta P}{L} \quad (b)$$

where $f \, Re_{D_h}^* \equiv f_u Re_u \times D_h^n \times \phi T^*$, $f \, Re_\phi^* \equiv f_u Re_u \times \phi^n \times \phi T^*$

[Equation 8]

$$u = -\frac{2D_h^3 \cdot \phi \, T}{\mu \cdot f \, Re_{D_h}^*} \frac{\Delta P}{L} \quad (n=1) \quad (a)$$

$$u \cong -\frac{2D_h^2 \cdot \phi^2 \, T}{\mu \cdot f \, Re_\phi^*} \frac{\Delta P}{L} \quad (n=1) \quad (b)$$

where $f \, Re_{D_h}^* \equiv f_u Re_u \times D_h^n \times \phi T^*$, $f \, Re_\phi^* \equiv f_u Re_u \times \phi^n \times \phi T^*$

[Equation 9]

$$k_{FEP} = \frac{2D_h^{n+2} \cdot \phi \, T}{f \, Re_{D_h}^*} \quad (a)$$

$$k_{FEP} \cong \frac{2D_h^2 \cdot \phi^{n+1} \, T}{f \, Re_\phi^*} \quad (b)$$

[Equation 10]

$$k_{FEP} = \frac{2D_h^3 \cdot \phi \, T}{f \, Re_{D_h}^*} \quad (n=1) \quad (a)$$

$$k_{FEP} \cong \frac{2D_h^2 \cdot \phi^2 \, T}{f \, Re_\phi^*} \quad (n=1) \quad (b)$$

In Equations 7 and 8, f.Re*$_{Dh}$ and f.Re*$_\phi$ are preserved as constant values for the same medium in a laminar flow region and as unique values in each flow region.

Equations 9 and 10, $k_{FEP}$ is permeability, $D_h$ is a hydraulic diameter, $\phi$ is porosity of a porous medium, T is tortuosity, f.Re*$_{Dh}$ is a friction factor-Reynolds number relationship based on a hydraulic diameter using laminar tortuosity, and f.Re*$_\phi$ is a friction factor-Reynolds number relationship based on porosity using laminar tortuosity.

Consequently, porous flow features associated with changes in geometric variables and flow conditions may be effectively analyzed based on a small number of actual tests by using Equations 7 to 10. Herein, similarity feature variables may be represented as special variables which express unique friction flow features of each porous medium. The similarity feature variables may quantitatively determine the above-described various variation features by conducting a basic test such as a simple flow rate test by only a few times, and thus may propose a very practical scheme. On the other hand, the conventionally proposed feature variables, e.g., a mean grain diameter and shape factors (Carman, 1938; Bear, 1975), may not be easily directly measured or quantitatively integrated.

Due to derivation of the similarity feature variables, Equations 7 to 10 may be effectively used for porous flow feature analyses associated with geometric changes and flow region variations. Nevertheless, unlike the constant similarity feature variables derived for flow analysis, other variables such as a hydraulic diameter, porosity, and tortuosity need to be determined. Herein, the porosity is a basic property value to be necessarily determined for each medium, but the hydraulic diameter and the tortuosity may be replaced to increase practicability. Archie (1942) has defined a formation factor based on resistivity of a porous material, and Cornell and Kart (1953) have disclosed a relationship between tortuosity and a formation factor based on a tilted capillary tube model considering the tortuosity. As such, the tortuosity may be expressed as a function of porosity as shown in Equation 11 (Bear, 1975). Using this, Equations 9 and 10 may be simplified to Equation 11.

[Equation 11]

$$k_{FEP} = \frac{2D_h^3 \cdot \varphi^m}{f \ Re_{D_h}^*} \quad (a)$$

$$k_{FEP} \cong \frac{2D_h^2 \cdot \varphi^{m+1}}{f \ Re_\varphi^*} \quad (b)$$

In Equation 11, $k_{FEP}$ is permeability, $D_h$ is a hydraulic diameter, $\varphi$ is porosity of a porous medium, m is a cementation factor of the Archie equation (Bear, 1975), $f.Re^*_{Dh}$ is a friction factor-Reynolds number relationship based on a hydraulic diameter using laminar tortuosity, and $f.Re^*_\varphi$ is a friction factor-Reynolds number relationship based on porosity using laminar tortuosity. $T=T_\varphi=\varphi^{m-1}$.)

To verify the validity of the relationship and to check its applicability to the models used in the present invention, tortuosity values $T_\varphi$ determined based on the Archie equation are shown in Table 9 and are compared to laminar tortuosity values T* derived based on DNS analyses.

Table 9 is a table comparatively showing tortuosity derived based on DNS analysis on each model and tortuosity derived based on the Archie equation, in a method of analyzing flow through a porous medium, according to an embodiment of the present invention.

TABLE 9

|   | (A) Thickest | (B) Thicker | (C) Base | (D) Thinner | (E) Thinnest |
|---|---|---|---|---|---|
| m | 2.37 | 2.36 | 2.35 | 2.34 | 2.33 |
| $T_\varnothing$ | 0.337 | 0.314 | 0.293 | 0.274 | 0.256 |
| T* | 0.322 | 0.312 | 0.298 | 0.277 | 0.255 |

Referring to Table 9, the tortuosity T* derived based on DNS analysis agrees well with the tortuosity $T_\varphi$ derived based on the Archie equation. Herein, a cementation factor m of the "Base" model is assumed as 2.35, cementation factors of the "thinner" and "thinnest" models are slightly reduced therefrom, and cementation factors of the "thickest" and "thicker" models are slightly increased therefrom. For reference, sandstone is known as having a cementation factor ranging from 1.3 to 2.0 based on a consolidation grade thereof (Bear, 1975). Considering that the microbeads used in the present invention have a diameter less than a mean diameter of sandstone and have small grains similar to those of siltstone having a higher cementation factor, the above assumption of the cementation factors seems to be reasonable. Consequently, application of the Archie equation to the models used in the present invention is proper, and an equation modified using the Archie equation is as shown in Equation 11. For reference, other tortuosity equations may be used as functions of porosity (Bear, 1975). Thus, Equation 9 may slightly differ when the other tortuosity equations are adopted.

In addition, as shown in Equation 12, a hydraulic diameter may be substituted with an original definition thereof. That is, since the hydraulic diameter should be additionally determined in Equation 11, the hydraulic diameter is substituted with an equation of porosity and thus permeability is corrected to the form of a function of porosity in which the hydraulic diameter does not appear. In this case, a f.Re value $f.Re_{Ss}^*$ modified based tortuosity correction and a specific surface area is additionally defined using the substitution.

[Equation 12]

$$u = -\frac{128 \ \varphi^{m+3}}{\mu \cdot f \ Re_{S_S}^*} \frac{\Delta P}{L} \quad (a)$$

$$k_{FEP} = \frac{128 \ \varphi^{m+3}}{f \ Re_{S_S}^*} \quad (b)$$

where $f \ Re_{S_S}^* \equiv S_S^3 \cdot f \ Re_{D_h}^* = 4 \ S_S^2 \cdot f \ Re_\varphi^*$, $D_h = \frac{4 \ \varphi}{S_S}$ In Equation 12, $k_{FEP}$ is permeability, $D_h$ is a hydraulic diameter, $\varphi$ is porosity of a porous medium, m is a cementation factor, $f.Re^*_{Dh}$ is a friction factor-Reynolds number relationship based on a hydraulic diameter using laminar tortuosity, $f.Re^*_\varphi$ is a friction factor-Reynolds number relationship based on porosity using laminar tortuosity, and $f.Re^*_{Ss}$ is a friction factor-Reynolds number relationship based on a hydraulic diameter using laminar tortuosity and a specific surface area.

Consequently, by applying porosity and $f.Re_{Ss}^*$ values to Equation 12(b), porous flow features and permeability may be more easily and practically calculated. The $f.Re_{Ss}^*$ values may be regarded as representative constant values for the models used in the present invention, because specific surface area values thereof are almost the same as shown in Table 1.

When the specific surface area value of the "Base" model is set as a representative constant value of the analysis models, Equation 12 may be modified to Equation 13.

[Equation 13]

$$u \approx -\frac{128 \ \varphi^{m+3}}{\mu \cdot f \ Re_{S_{SC}}^*} \frac{\Delta P}{L} \quad (a)$$

$$k_{FEP} \approx \frac{128 \ \varphi^{m+3}}{f \ Re_{S_{SC}}^*} = f(\varphi) \quad (b)$$

In Equation 13, $k_{FEP}$ is permeability, $\varphi$ is porosity of a porous medium, m is a cementation factor, and $f.Re^*_{Ssc}$ is a friction factor-Reynolds number relationship based on a hydraulic diameter using laminar tortuosity and a specific surface area having a constant value. In Equation 13, $f.Re^*_{Ssc} = f.Re^*_{Ss(c)} = S^3_{s(c)} \ f.Re^*_{Dh(c)}$ are constant values under each flow condition. Thus, $S_s$ is almost the same as $S_{s(c)}$ for all models, and $f.Re^*_{Dh}$ is almost the same as $f.Re^*_{Dh(c)}$ under each flow condition.

Consequently, permeability is expressed as only a constant $f.Re^*_{Ssc}$ value and a function of porosity as shown in Equation 13. As a result, the permeability includes simple variables and thus permeability variations may be more easily estimated. As such, easy applicability to most actual industrial sites may be expected.

Figure 10:
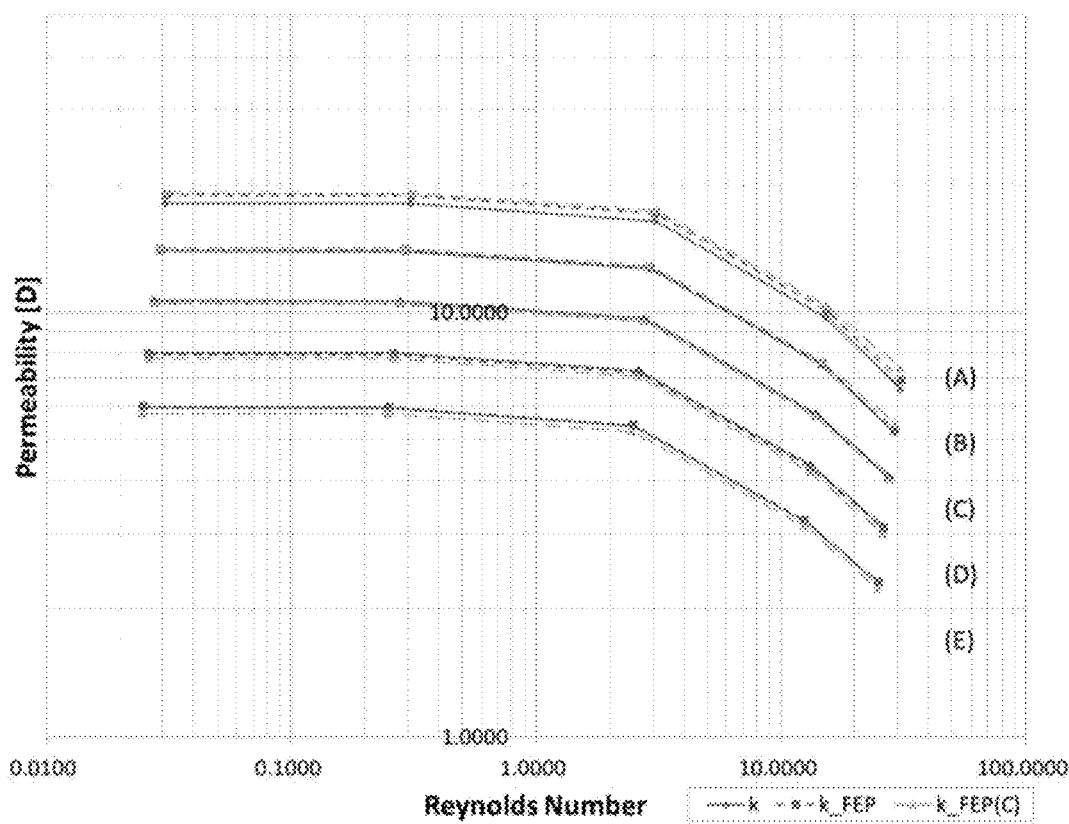
FIG. 10 is a graph comparatively showing tortuosity values of the models, in a method of analyzing flow through a porous medium, according to an embodiment of the present invention.

To check applicability and reliability of the derived equations, FEP values based on Equations 12 and 13 are compared to original permeability values k of the models under each flow condition as illustrated in FIG. 10.

FIG. 10 is a graph comparatively showing tortuosity values of the models, in a method of analyzing flow through a porous medium, according to an embodiment of the present invention.

In FIG. 10, (A) indicates the "Thickest" model, (B) indicates the "Thicker" model, (C) indicates the "Base" model, (D) indicates the "Thinner" model, and (E) indicates the "Thinnest" model. The FEP values based on Equation 12 are indicated by "k_FEP", and the FEP values based on Equation 13 are indicated by "k_FEP(C)".

Referring to FIG. 10, the FEP results obtained using Equations 12 and 13 agree well with the original permeability values k directly calculated based on the DNS analysis results. Although errors are slightly increased under high turbulent flow conditions due to approximation of cementation factors and specific surface area values, overall, the FEP values show good agreement. Thus, the equations derived and proposed in the present invention may be effectively used for porous flow feature analysis associated with certain degrees of geometric changes and flow condition variations. Even with slight accuracy reductions, Equations 12 and 13 may be more effectively applied to actual industrial sites because these equations do not require direct calculation of tortuosity and a hydraulic diameter.

In the following description, permeability variations in a case when geometric conditions such as porosity are changed due to, for example, formation stress changes of media, e.g., hydraulic fractures, of the same type will be calculated by adopting FEP equations. In Equations 7 to 13 derived above, equations modified based on a hydraulic diameter and indicated by "(a)" may be expressed for two types of media having different porosity values, as shown in Equation 14. Likewise, in Equations 7 to 13, equations modified based on porosity and indicated by "(b)" may be expressed as shown in Equation 15. Finally, the two equations may be expressed as the same type of equation corresponding to a function of porosity. Therefore, when a cementation factor m of a target medium may be determined and porosity of each medium may be calculated, permeability variations may be calculated based on these equations.

[Equation 14]

$$\frac{k_{FEP_2}}{k_{FEP_1}} = \frac{D_{h_2}^{n+2} \cdot \phi_2 T_2}{D_{h_1}^{n+2} \cdot \phi_1 T_1} = \frac{D_{h_2}^3 \cdot \phi_2^{m_2}}{D_{h_1}^3 \cdot \phi_1^{m_1}} = \frac{\phi_2^{m_2+3}}{\phi_1^{m_1+3}} \quad (n=1)$$

[Equation 15]

$$\frac{k_{FEP_2}}{k_{FEP_1}} \cong \frac{D_{h_2}^2 \cdot \phi_2^{n+1} T_2}{D_{h_1}^2 \cdot \phi_1^{n+1} T_1} = \frac{D_{h_2}^2 \cdot \phi_2^{m_2+1}}{D_{h_1}^2 \cdot \phi_1^{m_1+1}} \approx \frac{\phi_2^{m_2+3}}{\phi_1^{m_1+3}} \quad (n=1)$$

However, it is not easy at actual industrial sites to measure a specific porosity change or determine a cementation factor by performing core analysis. Thus, to easily calculate permeability variations, calculation based on a value (e.g., a formation (pore) pressure) directly measurable at industrial sites is much more practical. As such, when "an equation for defining a relationship between porosity and a pore (formation) pressure", e.g., a compressibility factor of a porous medium shown in Equation 14, is additionally adopted, the above permeability equation may be modified to a function of a pressure as shown in Equation 16. Thus, when Equation 16 is used, permeability variations may be calculated by measuring only a simple flow rate and a pressure without measuring or calculating all basic properties of the target medium.

[Equation 16]

$$\frac{k_{FEP_2}}{k_{FEP_1}} = \frac{\phi_2^{m_2+3}}{\phi_1^{m_1+3}}$$

$$\approx \left(\frac{\phi_2}{\phi_1}\right)^{m+3}$$

$$\approx (1 + C_f(P_2 - P_1))^{m+3}$$

where, $$\frac{\phi_2}{\phi_1} = 1 + C_f(P_2 - P_1),$$

$C_f$: Compressibility factor  &  $m \approx m_1$

A procedure of deriving Equations 1 and 2 will now be described in detail.

Basically, a hydraulic diameter of a porous medium may be defined based on a geometric relationship between a volume, porosity, and a specific surface area of the medium as shown in Equation 17. Kozeny has adopted the concepts of a grain shape factor $C_s$ and a mean grain diameter $d_m$ and has disclosed the definition of a hydraulic diameter of a porous medium as shown in Equation 18 in 1927 (Kozeny, 1927; Carman, 1938). In this case, when a hydraulic diameter of a porous medium in terms of rheology may be defined based on Equations 17 and 18, a Reynolds number of porous flow may also be determined. Thus, a flow velocity for determining the Reynolds number needs to be calculated on the basis of a pore flow path like calculation of the hydraulic diameter.

[Equation 17]

$$D_h = \frac{4\phi}{S_S}$$

$$\therefore \phi = \frac{V_p}{V_b} = \frac{S \cdot D_h}{4 \cdot V_b}$$

where $S = \pi D_h \cdot L$ and $S_S = \frac{S}{V_b}$

[Equation 18]

$$D_h = \frac{4\phi}{S_S} = \frac{4\phi}{S_{SLD}(1-\phi)} = \frac{4 \, d_m \phi}{C_S(1-\phi)}$$

Such a concept has already been considered in the prior study of Kozeny (1927) or Carman (1938). In particular, Carman has disclosed the definition of Equation 19 obtained by adopting the concept of tortuosity T disclosed by Kozeny, in an average fluid velocity u through a porous medium for consideration of an average fluid velocity v through an equivalent pore flow path (Carman, 1938). Consequently, a Reynolds number of porous flow may be expressed as shown in Equation 20 by adopting the Kozeny's definition of a hydraulic diameter and the Carman's definition of an average fluid velocity through an equivalent pore flow path. To define a friction factor of a porous medium, the Darcy friction factor definition of Equation 21 (White, 2001) which is used for general internal friction flow analysis is adopted. Like the above definition of the Reynolds number, when the concepts of an average fluid velocity through an equivalent pore flow path and tortuosity are adopted, a friction factor of porous flow may be expressed as shown in Equation 22. In this case, a pressure gradient term to which the concept of tortuosity disclosed by Kozeny is added is used (Carman, 1938). Equation 23 may be derived by multiplying the above-calculated Reynolds number by the friction factor.

[Equation 19]
$$v = \frac{u}{\phi}\left(\frac{L_e}{L}\right) = \frac{u}{\phi T^{\frac{1}{2}}}$$
where $T = \left(\frac{L}{L_e}\right)^2$

[Equation 20]
$$Re_v = \frac{\rho v D_h}{\mu} = \frac{\rho u D_h}{\phi \mu}\left(\frac{L_e}{L}\right) = \frac{Re_u}{\phi T^{\frac{1}{2}}}$$
where $Re_u = \frac{\rho u D_h}{\mu}$

[Equation 21]
$$\frac{-8\tau_w}{\rho V^2} = f = F\left(Re_D, \frac{\epsilon}{D}\right) \text{ or}$$
$$f = -\frac{2D}{\rho V^2}\frac{dP}{dx}$$
where, $\epsilon$: Roughness

[Equation 22]
$$f_v = -\left(\frac{2D_h}{\rho v^2}\frac{\Delta P}{L_e}\right)$$
$$= -\left(\frac{2D_h}{\rho u^2}\frac{\Delta P}{L}\right)\phi^2\left(\frac{L}{L_e}\right)^3$$
$$= f_u \phi^2 T^{\frac{3}{2}}$$

where
$$f_u = -\left(\frac{2D_h}{\rho u^2}\frac{\Delta P}{L}\right)$$

[Equation 23]
$$f_v Re_v = -\left(\frac{2D_h}{\rho v^2}\frac{\Delta P}{L_e}\right)\left(\frac{\rho v D_h}{\mu}\right)$$
$$= -\left(\frac{2D_h^2}{\mu \cdot u}\frac{\Delta P}{L}\right)\phi\left(\frac{L}{L_e}\right)^2$$
$$= f_u Re_u \cdot \phi T$$

When Equation 23 is expressed with respect to the average fluid velocity u, i.e., an apparent flow velocity, through the porous medium, a friction flow equation of the porous medium may be obtained as shown in Equation 1. Through comparison with the Darcy equation, Equation 1 may be modified to a permeability equation of Equation 2. Herein, Equation 2 is called a friction equivalent permeability (FEP) equation distinguishably from other permeability equations. Equation 1(a) and Equation 2(a) correspond to microscopic definitions on the basis of an equivalent pore flow path, and Equation 1(b) and Equation 2(b) correspond to macroscopic definitions on the basis of flow through media. Consequently, it is shown that Equation 1(b) has the same form as the Darcy's friction flow equation (the Darcy-Weisbach equation) used for general internal friction flow analysis. This shows that, by properly defining the hydraulic diameter, the Reynolds number, and the friction factor of the porous medium, porous flow may be represented as an internal friction flow equation for an equivalent pore flow path. Thus, Equation 1(b) may be regarded as the Darcy's friction flow equation generalized to be extensible to porous flow analysis. Equation 2(b) may be regarded as a general form of a theoretical permeability equation based on an equivalent flow path disclosed in the prior studies (Burmeister, 1993; Kaviany, 1952; Muskat, 1945).

CONCLUSION

In the present invention, friction flow features of porous flow associated with geometric and flow condition changes including preservation features of friction flow feature variables, e.g., f.Re values have been checked. A generalized Darcy friction flow relationship has been adopted to quantitatively check the friction flow feature variables, and then CFD simulation has been performed on simple hydraulic fractures filled with five layers of structurized microbeads and associated with geometric changes and flow region changes. DNS results of streamline distributions of models having five different fracture heights under five different flow conditions have been qualitatively analyzed. Consequently, it has been found that, even with fracture height changes, flow structures and sectional distribution shapes of main flow paths of all models are almost preserved. Unlike this, it has also been found that lack of streamlines and discontinuity of flow are rapidly increased in transitional and turbulent flow regions, which cause inaccurate calculation of tortuosity values.

Then, the friction flow features have been quantitatively and interpretatively analyzed. Through such analysis, it has been checked whether original f.Re values ($f_u.Re_u$ and $f_v.Re_v$) of the models are completely preserved as constant values even when changes in the $f_v.Re_v$ values are sufficiently less than changes in the permeability values. Consequently, it has been found that the original values are not directly usable as similarity (i.e., preservation) feature variables for porous flow analyses. As such, two modified f.Re values (f.Re$_{Dh}$ and f.Re$_\phi$) corrected based on a hydraulic diameter and porosity have been newly defined and have been modified to and defined as tortuosity-corrected feature variables such as f.Re$_{Dh}$* and f.Re$_\phi$*. Consequently, it has been found that the f.Re$_{Dh}$* and f.Re$_\phi$* values are fixed to constant values in laminar flow regions and are almost preserved as unique constant values in transitional and turbulent flow regions, regardless of fracture aperture changes. As such, as a main issue of the present invention, it has been found that both f.Re$_{Dh}$* and f.Re$_\phi$* values may be defined as similarity (i.e., preservation) feature variables of porous flow regardless of geometric changes.

The present invention can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, flash memory, and carrier waves (such as data transmission through the Internet). The computer-readable recording medium can also be distributed over network coupled computer systems so that the computer-readable code is stored and executed in a distributed fashion. Herein, a program or code stored in the recording medium is represented as a series of instructions directly or indirectly used in a device having data processing capability, e.g., a computer, to achieve a specific result. Thus, the term "computer" involves all devices including memory, an input/output unit, and an arithmetic unit and having data processing capability to perform a specific function based on the program.

The recording medium may store commands programmed to execute, on a computer, a method of calculating permeability of a porous medium, the method including obtaining hydraulic diameters and permeabilities of a plurality of reference porous media, deriving a hydraulic diameter-permeability correlation between the hydraulic diameters and the permeabilities, and calculating permeability of a porous medium to be predicted, by using the hydraulic diameter-permeability correlation.

The recording medium may store commands programmed to execute, on a computer, a method of calculating permeability of a porous medium, the method including obtaining hydraulic diameters and friction factor-Reynolds number relationships of a plurality of reference porous media, deriving a hydraulic diameter-friction factor-Reynolds number correlation between the hydraulic diameters and the friction factor-Reynolds number relationships, and calculating permeability of a porous medium to be predicted, by using the hydraulic diameter-friction factor-Reynolds number correlation.

The recording medium may store commands programmed to execute, on a computer, a method of calculating permeability of a porous medium, the method including obtaining a friction factor-Reynolds number relationship of a reference porous medium, obtaining a hydraulic diameter of a porous medium to be predicted, and calculating permeability of the porous medium to be predicted, by using the friction factor-Reynolds number relationship of the reference porous medium and the hydraulic diameter of the porous medium to be predicted.

While the present invention has been particularly shown and described with reference to embodiments thereof, it will be understood by one of ordinary skill in the art that various changes in form and details may be made therein without departing from the scope of the present invention as defined by the following claims.

INDUSTRIAL APPLICABILITY

Conclusionally, a generalized Darcy friction flow equation and a FEP equation are successfully modified using similarity feature variables. As such, porous flow features (including permeability variations) associated with fracture aperture reductions and flow condition changes may be effectively analyzed using these equations. For verification, FEP values of other fracture aperture models were predicted based on the DNS results of the model (C) and agreements thereof with permeability values directly calculated based on the DNS results were checked. Finally, it is expected the derived and verified method may effectively predict permeability variations of a porous medium under conditions of changes in basic geometric variables and flow regions, e.g., hydraulic fracture closure. At actual industrial sites, prediction of changes or calculation of a change pattern under changing geometric and flow conditions is essential for actual reservoir flow simulations and productivity analyses during several years or several decades. Therefore, the above-proposed method may be usefully utilized for not only test-based permeability calculation but also numerical-simulation-based productivity analysis.

Nomenclature

C: Coefficient or Factor,
D: Diameter,
$D_h$: Hydraulic Diameter,
f: Friction Factor,
H: Height, Fracture Height (Aperture),
k: Permeability,
$k_{FEP}$: FEP Permeability,
L: Length,
$L_e$: Real Path Length,
P: Pressure,
ΔP: Pressure Gradient,
R: Radius,
$R_h$: Hydraulic Radius,
Re: Reynolds Number,
$Re_{Dh}$: Re based on $D_h$,
S: Surface Area,
$S_S$: Specific Surface Area,
T: Tortuosity,
u: Average Fluid Velocity through a Porous Medium,
V: Volume,
$V_b$: Bilk Volume,
v: Average Fluid Velocity though Pore Flow Paths,
X,Y,Z: Position in X-, Y-, and Z-directions (Axis),
μ: Viscosity,
ρ: Density,
φ: Porosity,
Sub-Script
b: Bulk,
C: Constant, ~based on Constant, ~(C),
e: Real, Equivalent Pore Path,
FEP: Friction Equivalent Permeability,
h: Hydraulic,
$D_h$: ~based on Hydraulic Diameter,
Name, Number: Defined State or Case Number or Name,
p: Pore, Porous Media (Flow),
$V_P$: Pore Volume,
S: Specific Surface,
T: Tortuosity,
u: Average Flow Velocity through a Porous Medium, ~based on u
v: Average Fluid Velocity though Pore Paths, ~based on v,
variable: Special variable to be considered,
φ: Porosity,
Super-Script
m: Cementation Factor in Archie Equation,
n: Exponent Value of Hydraulic Diameter,
*: Pseudo, ~based on the Tortuosity Determined in a Laminar Flow,

REFERENCES

Achdou, Y. and Avellaneda, M., "Influence of pore roughness and pore-size dispersion in estimating the permeability of a porous medium from electrical measurements," Physics of Fluids A: Fluid Dynamics 4, 2651-2673 (1992).
Archie, G. E., "The electrical resistivity log as an aid in determining some reservoir characteristics," Trans. of AIME 146, 54-61 (1942).
Bear, J., Dynamics of fluids in porous media, (American Elservier Pub. Inc., 1975) p. 27-194.
Burmeister, L. C., Convective heat transfer, 2nd ed., (John Wiley & Sons, 1993) p. 44-51.
Carman, P. C., "Fluid flow through granular beds," Inst. Chem. Eng. 15, 150-166 (1937).

Carman, P. C., "The determination of the specific surface of powders," Trans. of J. Soc. Chem. Ind. 57(225), 225-234 (1938).

Carman, P. C., Flow of gases through porous media, (Butterworths Scientific Publications, 1956).

Carrier, W. D. III., "Goodbye, Hazen; Hellow, Kozeny-Carman," J. Geotechnical and Geoenvironmental Eng., ASCE, 1054-1056 (2003).

Cipolla, C. L., Williams, M. J., Weng, X., Mack, M. and Maxwell, S., "Hydraulic fracture monitoring to reservoir simulation: maximizing value," SPE ATCE 2010, SPE 133877 (2010).

Cornell, D. and Katz, D. L., "Flow of gases through consolidated porous media, "Ind. Eng. Chem. 45, 2145-2152 (1953).

Hazen, A., "Some physical properties of sands and gravels, with special reference to their use in filtration," 24th Annual Rep., Massachusetts State Board of Health. Doc. 24, 539-556 (1892).

Ingham, D. B. and Pop, I., Transport Phenomena in Porous Media Vol. I, (Pergamon, Oxford, 1998).

Ingham, D. B. and Pop, I., Transport Phenomena in Porous Media Vol. II, (Pergamon, Oxford, 2002).

Ingham, D. B. and Pop, I., Transport Phenomena in Porous Media Vol. III, (Pergamon, Oxford, 2005).

Ingham, D. B. and Pop, I., Convective Heat Transfer: Mathematical and Computational Viscous Fluids and Porous Media, (Pergamon, Oxford, 2001).

Kozeny, J. "Ueberkapillareleitung des wassersimboden. Sitzungsberichte der," Akademie der Wissenschaften in Wien. 136, 271-306 (1927).

Muskat, M. The flow of homogeneous fluids through porous media, (McGraw-Hill Inc., 1946).

Nelson. P. H., "Permeability-porosity relationships in sedimentary rocks," The Log Analyst 35(3), 38-62 (1994).

Nield, D. A. and Bejan, A., Convection in Porous Media 3$^{rd}$ ed., (Springer, New York, 2013).

Paterson, M. S., "The equivalent channel model for permeability and resistivity in fluid-saturated rock-A re-appraisal," Mechanics of Materials 2, 345-352 (1983).

Rose, H. E. "An investigation into the laws of flow of fluids through beds of granular material," Proc. Inst. Mech. Eng. 153, 141-148 (1945).

Shin, C. H. and Part, W. G., "DNS study on the flow characteristics through simple porous hydraulic fractures, "J. Comput. Fluids Eng., Trans. of KSCFE21(4), 19-27 (2016).

Shin, C. H., "Tortuosity correction of Kozeny's hydraulic diameter of a porous medium," Physics of Fluids 29, 023104 (2017).

Shin, C. H. and Park, W. G., "Expansion of the Darcy-Weisbach relation for porous flow analysis," Trans. of KSME (B) 41(4), 229-238 (2017).

White, F. M., Fluid dynamics, 4th ed., (McGraw-Hill, New York, 2001) p. 325-404.

The invention claimed is:

1. A method of calculating permeability of a porous medium, the method comprising:
   obtaining hydraulic diameters and friction factor-Reynolds number relationships of a plurality of reference porous media;
   deriving a hydraulic diameter-friction factor-Reynolds number correlation between the hydraulic diameters and the friction factor-Reynolds number relationships; and
   obtaining permeability of a porous medium to be predicted, by using the hydraulic diameter-friction factor-Reynolds number correlation.

2. The method of claim 1, wherein the obtaining of the permeability of the porous medium to be predicted comprises:
   obtaining a flow-velocity-based permeability of the porous medium to be predicted, by using the hydraulic diameter-friction factor-Reynolds number correlation;
   obtaining a hydraulic-diameter-based permeability by correcting the flow-velocity-based permeability by using a hydraulic diameter; and
   obtaining a final hydraulic-diameter-based permeability as the permeability of the porous medium to be predicted, by correcting the hydraulic-diameter-based permeability by using laminar tortuosity.

3. The method of claim 2, wherein the flow-velocity-based permeability is calculated and obtained using an equation shown below $$k_{FEP} = \frac{2D_h^2}{f_u \, Re_u}$$

(where $k_{FEP}$ is permeability, $D_h$ is a hydraulic diameter, T is tortuosity, $f_u$ is a friction factor based on a flow velocity u, and $Re_u$ is a Reynolds number based on the flow velocity u.)

4. The method of claim 2, wherein the obtaining of the hydraulic-diameter-based permeability is performed using an equation shown below $$f Re_{D_h} = f_v Re_v \times D_h^n = f_u Re_u \times D_h^u \times \phi T$$

where $f_v \, Re_v = f_u Re_u \times \phi T$ (where $f.Re_\phi$ is a friction factor-Reynolds number relationship based on porosity, $f_v$ is a friction factor based on a flow velocity v, $Re_v$ is a Reynolds number based on the flow velocity v, $f_u$ is a friction factor based on a flow velocity u, $Re_u$ is a Reynolds number based on the flow velocity u, $D_h$ is a hydraulic diameter, $\varphi$ is porosity of a porous medium, and T is tortuosity.)

5. The method of claim 2, wherein the hydraulic-diameter-based permeability is calculated and obtained using an equation shown below $$k_{FEP} = \frac{2D_h^{n+2} \cdot \phi T}{f \, Re_{D_h}}$$

(where $k_{FEP}$ is permeability, $D_h$ is a hydraulic diameter, $\varphi$ is porosity of a porous medium, T is tortuosity, and $f.Re_{D_h}$ is a friction factor-Reynolds number relationship based on a hydraulic diameter.)

6. The method of claim 5, wherein the friction factor-Reynolds number relationship $f.Re_{D_h}$ based on the hydraulic diameter has a constant value for the same medium in a laminar flow region.

7. The method of claim 2, wherein the obtaining of the final hydraulic-diameter-based permeability is performed using an equation shown below $$k_{FEP} = \frac{2D_h^{n+2} \cdot \phi T}{f \, Re_{D_h}^*}$$

(where $k_{FEP}$ is permeability, $D_h$ is a hydraulic diameter, $\varphi$ is porosity of a porous medium, T is tortuosity, and $f.Re^*_{D_h}$ is a friction factor-Reynolds number relationship based on a hydraulic diameter using laminar tortuosity.)

8. The method of claim 2, wherein the obtaining of the final hydraulic-diameter-based permeability is performed using an equation shown below $$k_{FEP} = \frac{2D_h^3 \cdot \varphi T}{f\, Re^*_{D_h}}$$

(where $k_{FEP}$ is permeability, $D_h$ is a hydraulic diameter, $\varphi$ is porosity of a porous medium, T is tortuosity, and $f.Re^*_{D_h}$ is a friction factor-Reynolds number relationship based on a hydraulic diameter using laminar tortuosity.)

9. The method of claim 2, wherein the obtaining of the final hydraulic-diameter-based permeability is performed using an equation shown below $$k_{FEP} = \frac{2D_h^3 \cdot \varphi^m}{f\, Re^*_{D_h}}$$

(where $k_{FEP}$ is permeability, $D_h$ is a hydraulic diameter, $\varphi$ is porosity of a porous medium, m is a cementation factor, and $f.Re^*_{D_h}$ is a friction factor-Reynolds number relationship based on a hydraulic diameter using laminar tortuosity.)

10. The method of claim 2, wherein the obtaining of the final hydraulic-diameter-based permeability is performed using an equation shown below $$k_{FEP} = \frac{128\, \varphi^{m+3}}{f\, Re^*_{S_s}}$$

(where $k_{FEP}$ is permeability, $\varphi$ is porosity of a porous medium, m is a cementation factor, and $f.Re^*_{S_s}$ is a friction factor-Reynolds number relationship based on a hydraulic diameter using laminar tortuosity and a specific surface area.)

11. The method of claim 2, wherein the obtaining of the final hydraulic-diameter-based permeability is performed using an equation shown below $$k_{FEP} \approx \frac{128\, \varphi^{m+3}}{f\, Re^*_{S_{sc}}} = f(\varphi)$$

(where $k_{FEP}$ is permeability, $\varphi$ is porosity of a porous medium, m is a cementation factor, and $f.Re^*_{S_{sc}}$ is a friction factor-Reynolds number relationship based on a hydraulic diameter using laminar tortuosity and a specific surface area having a constant value.)

12. The method of claim 1, wherein the obtaining of the permeability of the porous medium to be predicted comprises:
obtaining a flow-velocity-based permeability of the porous medium to be predicted, by using the hydraulic diameter-friction factor-Reynolds number correlation;

obtaining a porosity-based permeability by correcting the flow-velocity-based permeability by using porosity; and
obtaining a final porosity-based permeability as the permeability of the porous medium to be predicted, by correcting the porosity-based permeability by using laminar tortuosity.

13. The method of claim 12, wherein the obtaining of the final porosity-based permeability is performed using an equation shown below $$k_{FEP} \cong \frac{2D_h^2 \cdot \varphi^{n+1} T}{f\, Re^*_\varphi}$$

(where $k_{FEP}$ is permeability, $D_h$ is a hydraulic diameter, $\varphi$ is porosity of a porous medium, T is tortuosity, and $f.Re^*_\varphi$ is a friction factor-Reynolds number relationship based on porosity using laminar tortuosity.)

14. The method of claim 12, wherein the obtaining of the final porosity-based permeability is performed using an equation shown below $$k_{FEP} \cong \frac{2D_h^2 \cdot \varphi^2 T}{f\, Re^*_\varphi}$$

(where $k_{FEP}$ is permeability, $D_h$ is a hydraulic diameter, $\varphi$ is porosity of a porous medium, T is tortuosity, and $f.Re^*_\varphi$ is a friction factor-Reynolds number relationship based on porosity using laminar tortuosity.)

15. The method of claim 12, wherein the obtaining of the final porosity-based permeability is performed using an equation shown below $$k_{FEP} \cong \frac{2D_h^2 \cdot \varphi^{m+1}}{f\, Re^*_\varphi}$$

(where $k_{FEP}$ is permeability, $D_h$ is a hydraulic diameter, $\varphi$ is porosity of a porous medium, m is a cementation factor, and $f.Re^*_\varphi$ is a friction factor-Reynolds number relationship based on porosity using laminar tortuosity.)

16. The method of claim 12, wherein the flow-velocity-based permeability is calculated and obtained using an equation shown below $$k_{FEP} = \frac{2D_h^2 \cdot \varphi T}{f_v\, Re_v}$$

(where $k_{FEP}$ is permeability, $D_h$ is a hydraulic diameter, $\varphi$ is porosity of a porous medium, T is tortuosity, $f_v$ is a friction factor based on a flow velocity v, and $Re_v$ is a Reynolds number based on the flow velocity v.)

17. The method of claim 12, wherein the obtaining of the porosity-based permeability is performed using an equation shown below $$f Re_\varphi = f_v Re_v \times \varphi^n = f_u Re_u \times \varphi^n \times \varphi T$$

where $f_v\, Re_v = f_u\, Re_u \times \varphi T$ (where $f.Re_\varphi$ is a friction factor-Reynolds number relationship based on porosity, $f_v$ is a friction factor based on a flow velocity v, $Re_v$ is a Reynolds number based on the flow velocity v, $f_u$ is a friction factor based on a flow velocity u, $Re_u$ is a Reynolds number based on the flow velocity u, $\varphi$ is porosity of a porous medium, and T is tortuosity.)

18. The method of claim 12, wherein the porosity-based permeability is calculated and obtained using an equation shown below $$k_{FEP} \cong \frac{2D_h^2 \cdot \varphi^{n+1} T}{f\,Re_\varphi}$$

(where $k_{FEP}$ is permeability, $D_h$ is a hydraulic diameter, $\varphi$ is porosity of a porous medium, T is tortuosity, and $f.Re_\varphi$ is a friction factor-Reynolds number relationship based on porosity.)

19. The method of claim 18, wherein the friction factor-Reynolds number relationship $f.Re^*_\varphi$ based on the porosity has a constant value for the same medium in a laminar flow region.

* * * * *